US011974091B2

(12) United States Patent
Zheng et al.

(10) Patent No.: US 11,974,091 B2
(45) **Date of Patent: *Apr. 30, 2024**

(54) APPARATUS AND METHODS FOR BONE CONDUCTION SPEAKER

(71) Applicant: SHENZHEN SHOKZ CO., LTD., Shenzhen (CN)

(72) Inventors: Jinbo Zheng, Shenzhen (CN); Fengyun Liao, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 251 days.

This patent is subject to a terminal disclaimer.

(21) Appl. No.: 17/335,154

(22) Filed: Jun. 1, 2021

(65) Prior Publication Data

US 2021/0289285 A1 Sep. 16, 2021

Related U.S. Application Data

(63) Continuation of application No. 16/922,965, filed on Jul. 7, 2020, now Pat. No. 11,115,751, which is a (Continued)

(30) Foreign Application Priority Data

Jun. 15, 2018 (CN) ......................... 201810624043.5

(51) Int. Cl.
*H04R 25/00* (2006.01)
*H04R 1/10* (2006.01)
*H04R 9/02* (2006.01)

(52) U.S. Cl.
CPC ........... *H04R 1/1091* (2013.01); *H04R 9/025* (2013.01); *H04R 2460/13* (2013.01)

(58) Field of Classification Search
CPC .... H04R 1/1016; H04R 1/44; H04R 2420/07; H04R 1/02; H04R 1/26; H04R 1/1075; (Continued)

(56) References Cited

U.S. PATENT DOCUMENTS

| | | | | |
|---|---|---|---|---|
| 2,832,842 A | | 4/1958 | Knauert | |
| 4,612,915 A | * | 9/1986 | Hough | H04R 25/606 381/326 |

(Continued)

FOREIGN PATENT DOCUMENTS

| | | |
|---|---|---|
| CN | 201215970 Y | 4/2009 |
| CN | 202488645 U | 10/2012 |

(Continued)

OTHER PUBLICATIONS

Notice of Reasons for Rejection in Japanese Application No. 2020-569946 dated Feb. 21, 2022, 10 pages.

(Continued)

*Primary Examiner* — Amir H Etesam
(74) *Attorney, Agent, or Firm* — METIS IP LLC

(57) ABSTRACT

A bone conduction speaker is provided herein. The bone conduction speaker may include a magnetic circuit component for providing a magnetic field, a vibration component located in the magnetic field, and a case. At least a part of the vibration component may convert an electrical signal into a mechanical vibration signal. The case may include a case panel facing a human body side and a case back opposite to the case panel, and accommodate the vibration component that causes the case panel and the case back to vibrate. A vibration of the case panel may have a first phase, and a vibration of the case back may have a second phase. When frequencies of the vibration of the case panel and the (Continued)

1700 case back are within 2000 Hz to 3000 Hz, an absolute value of a difference between the first and the second phase(s) may be less than 60 degrees.

20 Claims, 17 Drawing Sheets

Related U.S. Application Data continuation of application No. PCT/CN2019/070545, filed on Jan. 5, 2019.

(58) Field of Classification Search
CPC H04R 1/1091; H04R 1/1041; H04R 2460/13; H04R 1/1066; H04R 1/105
See application file for complete search history.

(56) References Cited

U.S. PATENT DOCUMENTS

| | | | | |
|---|---|---|---|---|
| 9,100,732 | B1 | 8/2015 | Dong et al. | |
| 10,897,677 | B2 | 1/2021 | Walraevens et al. | |
| 11,336,991 | B2 * | 5/2022 | Li | H04R 5/0335 |
| 2006/0002577 | A1 | 1/2006 | Won et al. | |
| 2013/0148834 | A1 | 6/2013 | Seo | |
| 2014/0055932 | A1 | 2/2014 | Nakamura | |
| 2014/0185822 | A1 | 7/2014 | Kunimoto et al. | |
| 2014/0355777 | A1 | 12/2014 | Nabata et al. | |
| 2016/0261958 | A1 | 9/2016 | Jurisch et al. | |
| 2017/0164088 | A1 | 6/2017 | Fukuda | |
| 2017/0295269 | A1 | 10/2017 | Hosoi et al. | |
| 2017/0374479 | A1 | 12/2017 | Qi et al. | |
| 2019/0132689 | A1 | 5/2019 | Qi et al. | |
| 2020/0336824 | A1 | 10/2020 | Zheng et al. | |
| 2021/0076123 | A1 | 3/2021 | Zhang et al. | |
| 2021/0092525 | A1 | 3/2021 | Zheng et al. | |
| 2021/0116719 | A1 | 4/2021 | Wang et al. | |
| 2021/0160633 | A1 | 5/2021 | Liao et al. | |
| 2021/0168493 | A1 | 6/2021 | Zheng et al. | |

FOREIGN PATENT DOCUMENTS

| | | | |
|---|---|---|---|
| CN | 203840528 | U | 9/2014 |
| CN | 105007551 | A | 10/2015 |
| CN | 105472511 | A | 4/2016 |
| CN | 106937222 | A | 7/2017 |
| CN | 106954152 | A | 7/2017 |
| CN | 206533537 | U | 9/2017 |
| CN | 107426847 | A | 12/2017 |
| CN | 104394492 | B | 3/2018 |
| CN | 207070281 | U | 3/2018 |
| CN | 107948883 | A | 4/2018 |
| CN | 108989514 | A | 12/2018 |
| EP | 2800395 | A1 | 11/2014 |
| EP | 3796670 | A1 | 3/2021 |
| GB | 2454605 | A | 5/2009 |
| JP | 2006148295 | A | 6/2006 |
| JP | 2006332715 | A | 12/2006 |
| JP | 2007049599 | A | 2/2007 |
| JP | 2007096386 | A | 4/2007 |
| JP | 2008054063 | A | 3/2008 |
| KR | 101849041 | B1 | 4/2018 |
| KR | 101934229 | B1 | 12/2018 |
| TW | 201820891 | A | 6/2018 |

OTHER PUBLICATIONS

First Examination Report in Indian Application No. 202017054479 dated Dec. 20, 2021, 5 pages.
Decision on Grant in Russian Application No. 2021100591 dated Jul. 5, 2021, 17 pages.
International Search Report in PCT/CN2019/102382 dated Nov. 22, 2019, 7 pages.
Written Opinion in PCT/CN2019/102382 dated Nov. 22, 2019, 10 pages.
International Search Report in PCT/CN2019/070545 dated Apr. 10, 2019, 6 pages.
Written Opinion in PCT/CN2019/070545 dated Apr. 10, 2019, 8 pages.
The Extended European Search Report in European Application No. 19818634.8 dated Jun. 15, 2021, 14 pages.
Jia You Er Ha, The Immature Black Technology_AfterShokz AS500 Bone Conduction Stereo Bluetooth Headset, What's Worth Buying On, 2015, 23 pages.
Charlie, What's it like to listen to songs with your skull—AfterShokz AS500 Bone Conduction Headphones Trial Experience, JIGUO,2015, 18 pages.
Test Report of China Institute of Metrology (Phase Difference Test Report), 2023, 14 pages.
Test Report of China Institute of Metrology (Frequency Response Curve Test Report), 2023, 8 pages.
Notarization, 2023, 88 pages.
Forbrain Auditory Feedback Headphones with Bone Conduction Technology—Tool to Enhance Speech Memory and Attention—Used by Singers Vocalists Kids with Autism ADD ADHD Speech Delays, Amazon.com, 2023, 18 pages.
Forbrain Animation Video And Principles, Youtube, 2014, 30 pages.
Meng Zhi Jing, Forbrain Learning Bone Conduction Headset—Make Your Baby Love Learning, JIGUO, 2017, 31 pages.
Yang Fan Cheng Zhang, How TDSA Tornatis Helps Children, 2018, SOHU.com, 33 pages.
Anonymous, What are the Precautions for Using Forbrain for the First Time?, 2016, 2 pages.
Dong BA, Tomatis hearing training for children with developmental delays, StarAngels.com, 2016, 14 pages.

* cited by examiner

APPARATUS AND METHODS FOR BONE CONDUCTION SPEAKER

CROSS-REFERENCE TO THE RELATED APPLICATIONS

This application is a continuation of U.S. application Ser. No. 16/922,965, filed on Jul. 7, 2020, which is a continuation of International Application No. PCT/CN2019/070545, filed on Jan. 5, 2019, which claims priority to Chinese Patent Application No. 201810624043.5, filed on Jun. 15, 2018, the entire contents of each of which are hereby incorporated by reference.

TECHNICAL FIELD

The present disclosure relates to a bone conduction earphone, and more particularly, to a bone conduction earphone provided with a bone conduction speaker for improving the sound quality and reducing sound leakage.

BACKGROUND

Bone conduction speakers can convert an electrical signal into a mechanical vibration signal, and transmit the mechanical vibration signal into a human auditory nerve through human tissues and bones so that a wearer of the speaker can hear the sound. Since a bone conduction speaker transmits sound through a mechanical vibration, when the bone conduction speaker works, it may drive surrounding air to vibrate, causing sound leakage. The present disclosure provides a bone conduction speaker with a simple structure and a compact size, which can significantly reduce the sound leakage of bone conduction earphones and improve the sound quality of bone conduction earphones.

SUMMARY

Consequently, it is an object of the present disclosure to provide a bone construction speaker which solves the above problems inherent in the fields. More specifically, it is an object of the present disclosure to provide a bone construction speaker to simplify the structure of the bone conduction speaker, reduce sound leakage, and improve the sound quality.

In order to achieve the object of the present disclosure, the present disclosure provides the following technical solutions.

A bone conduction speaker is provided. The bone conduction speaker may include a magnetic circuit component, a vibration component, and a case. The magnetic circuit component may be configured to provide a magnetic field. At least a part of the vibration component may be located in the magnetic field. The vibration component may convert an electrical signal inputted into the vibration component into a mechanical vibration signal. The case may include a case panel facing a human body side and a case back opposite to the case panel. The case may accommodate the vibration component. The vibration component may cause the case panel and the case back to vibrate. A vibration of the case panel may have a first phase, and a vibration of the case back may have a second phase. When a frequency of the vibration of the case panel and a frequency of the vibration frequency of the case back are within a range of 2000 Hz and 3000 Hz, an absolute value of a difference between the first phase and the second phase may be less than 60 degrees.

In some embodiments, the vibration of the case panel may have a first amplitude and the vibration of the case back may have a second amplitude. A ratio of the first amplitude to the second amplitude may be within a range of 0.5 to 1.5.

In some embodiments, the vibration of the case panel may generate a first sound leakage wave and the vibration of the case back may generate a second sound leakage wave. The first sound leakage wave and the second sound leakage wave may have an overlapping that reduces the amplitude of the first sound leakage wave.

In some embodiments, the case panel and the case back may be made of a material with a Young's modulus greater than 4000 Mpa.

In some embodiments, a difference between an area of the case panel and the case back is less than 30% of the area of the case panel.

In some embodiments, the bone conduction speaker may further include a first element. The vibration component may be connected to the case through the first element. The Young's modulus of the first element may be greater than 4000 Mpa.

In some embodiments, the case panel and one or more parts of the case may be connected by at least one of gluing, clamping, welding, or screwing.

In some embodiments, the case panel and the case back may be made of a fiber-reinforced plastic material.

In some embodiments, the bone conduction speaker may further include an earphone fixing component that is configured to maintain a stable contact between the bone conduction speaker and the human body. The earphone fixing component may be fixedly connected to the bone conduction speaker through an elastic member.

In some embodiments, the bone conduction speaker may generate two low-frequency resonance peaks in the frequency range of less than 500 Hz.

In some embodiments, the two low-frequency resonance peaks may be related to elastic moduli of the vibration component and the earphone fixing component.

In some embodiments, the two low-frequency resonance peaks generated at the frequency less than 500 Hz may correspond to the earphone fixing component and the vibration component, respectively.

In some embodiments, the bone conduction speaker may generate at least two high-frequency resonance peaks at a frequency greater than 2000 Hz. The two high-frequency resonance peaks may be related to at least one of an elastic modulus of the case, a volume of the case, stiffness of the case panel or stiffness of the case back.

In some embodiments, the vibration component may include a coil and a vibration transmission sheet. At least a part of the coil may be located in the magnetic field, and moves in the magnetic field under a drive of an electric signal.

In some embodiments, one end of the vibration transmission sheet may be in contact with an inner surface of the case, and the other end of the vibration transmission sheet may be in contact with the magnetic circuit component.

In some embodiments, the bone conduction speaker may further include a first element. The coil may be connected to the case through the first element. The first element may be made of a material with a Young's modulus greater than 4000 Mpa.

In some embodiments, the bone conduction speaker may further include a second element. The magnetic circuit system may be connected to the case through the second element. An elastic modulus of the first element may be greater than an elastic modulus of the second element.

In some embodiments, the second element may be a vibration transmission sheet, and the vibration transmission sheet may be an elastic member.

In some embodiments, the vibration transmission sheet may be a three-dimensional structure, which is able to make a mechanical vibration in its own thickness space.

In some embodiments, the magnetic circuit component may include a first magnetic element, a first magnetically conductive element, and a second magnetically conductive element. A lower surface of the first magnetic element may be connected to an upper surface of the first magnetic element. An upper surface of the second magnetic element may be connected to a lower surface of the first magnetic element. The second magnetically conductive element may have a groove. The first magnetic element and the first magnetically conductive element may be fixed in the groove. There may be a magnetic gap between the first magnetic element and a side surface of the second magnetically conductive element.

In some embodiments, the magnetic circuit component may further include a second magnetic element. The second magnetic element may be disposed above the first magnetically conductive element. The magnetization directions of the second magnetic element and the first magnetic element may be opposite.

In some embodiments, the magnetic circuit component may further include a third magnetic element. The third magnetic element may be disposed below the second magnetically conductive element. The magnetization directions of the third magnetic element and the first magnetic element may be opposite.

A method for testing a bone conduction speaker is provided. The method may include sending a test signal to the bone conduction speaker. The bone conduction speaker may include a vibration component and a case that houses the vibration component. The case may include a case panel and a case back that are respectively located at two sides of the vibration component. The vibration component may cause vibrations of the case panel and the case back based on the test signal. The method may include acquiring a first vibration signal corresponding to the vibration of the case panel. The method may also include acquiring a second vibration signal corresponding to the vibration of the case back. The method may further include determining a phase difference between the vibrations of the case panel and the vibration of the case back based on the first vibration signal and the second vibration signal.

In some embodiments, the determining the phase difference between the vibration of the case panel and the vibration of the case back based on the first vibration signal and the second vibration signal may include acquiring a waveform of the first vibration signal and a waveform of the second vibration signal, and determining the phase difference based on the waveform of the first vibration signal and the waveform of the second vibration signal.

In some embodiments, the determining the phase difference between the vibration of the case panel and the vibration of the case back based on the first vibration signal and the second vibration signal may include determining a first phase of the first vibration signal based on the first vibration signal and the test signal, determining a second phase of the second vibration signal based on the second vibration signal and the test signal, and determining the phase difference based on the first phase and the second phase.

In some embodiments, the test signal may be a sinusoidal periodic signal.

In some embodiments, the acquiring the first vibration signal corresponding to the vibration of the case panel may include emitting a first laser to an outer surface of the case panel, receiving a first reflected laser light generated by the outer surface of the case panel via reflecting the first laser light, and determining the first vibration signal based on the first reflected laser light.

In some embodiments, the acquiring a second vibration signal corresponding to the vibration of the case back may include emitting a second laser to the outer surface of the case back, receiving a second reflected laser light generated by the outer surface of the case back via reflecting the second laser light, and determining the second vibration signal based on the second reflected laser light.

A bone conduction speaker may include a magnetic circuit component, a vibration component, a case, and an earphone fixing component. The magnetic circuit component may be configured to provide a magnetic field. At least a part of the vibration component may be located in the magnetic field. The vibration component may convert an electrical signal inputted into the vibration component into a mechanical vibration signal. The case may house the vibration component. The earphone fixing component may be fixedly connected to the case for maintaining the bone conduction speaker in contact with the human body. The case may have a case panel facing the human body side and a case back opposite to the case panel, and a case side located between the case panel and the case back. The vibration component may cause the case panel and the case back to vibrate.

In some embodiments, the case back of the case side may be an integrally formed structure. The case panel may be connected to the case side by at least one of gluing, clamping, welding, or screwing.

In some embodiments, the case panel and the outer shell side may be an integrally formed structure. The case back may be connected to the case side by at least one of gluing, clamping, welding, or screwing.

In some embodiments, the bone conduction speaker may further include a first element. The vibration component may be connected to the case through the first element.

In some embodiments, the case side and the first element may be an integrally formed structure. The case panel may be connected to an outer surface of the first element by at least one of gluing, clamping, welding, or screwing. The case back may be connected to the case side by at least one of gluing, clamping, welding, or screwing.

In some embodiments, the earphone fixing component and the case back or the case side may be an integrally formed structure.

In some embodiments, the earphone fixing component may be connected to the case back or the case side by at least one of gluing, clamping, welding, or screwing.

In some embodiments, the case may be a cylinder, and the case panel and the case back may be an upper end surface and a lower end surface of the cylinder, respectively. The projected areas of the case panel and the case back on a cross section of the cylinder perpendicular to the axis may be equal.

In some embodiments, a vibration of the case panel may have a first phase, and a vibration of the case back may have a second phase. When a frequency of the vibration of the case panel and a frequency of the vibration of the case back are within a range of 2000 Hz to 3000 Hz, an absolute value of a difference between the first phase and the second phase may be less than 60 degrees.

In some embodiments, the vibration of the case panel and the vibration of the case back may include a vibration with a frequency within a range of 2000 Hz to 3000 Hz.

In some embodiments, the case panel and the case back may be made of a material with a Young's modulus greater than 4000 Mpa.

In some embodiments, the bone conduction speaker may further include a first element. The vibration component may be connected to the case through the first element. A Young's modulus of the first element may be greater than 4000 Mpa.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
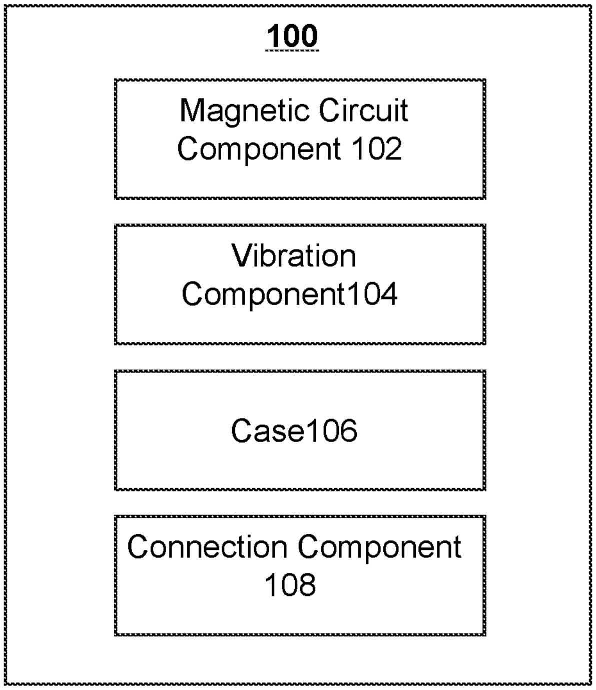
FIG. 1 is a schematic diagram illustrating a bone conduction earphone according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment". The term "another embodiment" means "at least one other embodiment". Related definitions of other terms will be provided in the descriptions below. In the following, without loss of generality, the description of "bone conduction speaker" or "bone conduction earphone" will be used when describing the bone conduction related technologies in the present disclosure. This description is only a form of bone conduction application. For a person of ordinary skill in the art, "speaker" or "earphone" can also be replaced with other similar words, such as "player", "hearing aid", or the like. In fact, various implementations in the present disclosure may be easily applied to other non-loudspeaker-type hearing devices. For example, for professionals in the field, after understanding the basic principles of the bone conduction earphone, multiple variations and modifications may be made on forms and details of the specific methods and steps for implementing the bone conduction earphones, in particular, an addition of ambient sound pickup and processing functions to the bone conduction earphones so as to enable the earphones to function as a hearing aid, without departing from the principle. For example, a sound transmitter such as a microphone may pick up an ambient sound of the user/wearer, process the sound using a certain algorithm, and transmit the processed sound (or a generated electrical signal) to the bone conduction speaker. That is, the bone conduction earphone may be modified and have the function of picking up ambient sound. The ambient sound may be processed and transmitted to the user/wearer through the bone conduction speaker, thereby implementing the function of a bone conduction hearing aid. For example, the algorithm mentioned here may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

FIG. 1 is a schematic diagram illustrating a bone conduction speaker 100 according to some embodiments of the present disclosure. As shown in FIG. 1, the bone conduction speaker 100 may include a magnetic circuit component 102, a vibration component 104, a case 106, and a connection component 108.

The magnetic circuit component 102 may provide a magnetic field (also referred to as a total magnetic field). The magnetic field may be used to convert a signal containing sound information (also referred to as sound signal) into a vibration signal. In some embodiments, the sound information may include a video and/or audio file having a specific data format, or data or files that may be converted into sound through a specific way. The sound signal may be transmitted from the storage component of the bone conduction speaker 100 itself, or may be transmitted from an information generation, storage, or transmission system other than the bone conduction speaker 100. The sound signal may include an electric signal, an optical signal, a magnetic signal, a mechanical signal, or the like, or any combination thereof. The sound signal may be from a signal source or a plurality of signal sources. The plurality of signal sources may be related and not be related. In some embodiments, the bone conduction speaker 100 may obtain the sound signal in a variety of different ways. The acquisition of the signal may be wired or wireless, and may be real-time or delayed. For example, the bone conduction speaker 100 may receive an electrical signal containing the sound information via wired or wireless methods, or may directly obtain data from a storage medium to generate a sound signal. As another example, a bone conduction hearing aid may include a component for sound collection. The mechanical vibration of the sound may be converted into an electrical signal by picking up sound in the environment, and an electrical signal that meets specific requirements may be obtained after being processed by an amplifier. In some embodiments, the wired connection may include using a metal cable, an optical cable, or a hybrid cable of metal and optics, for example, a coaxial cable, a communication cable, a flexible cable, a spiral cable, a non-metal sheathed cable, a metal sheathed cable, a multi-core cable, a twisted pair cable, a ribbon cable, shielded cable, a telecommunication cable, a twisted pair cable, a parallel twin conductor, a twisted pair, or the like, or any combination thereof. The examples described above are merely for the convenience of explanation. The wired connection media may be of other types, such as other electrical or optical signal transmission carriers.

The wireless connection may include a radio communication, a free-space optical communication, an acoustic communication, and an electromagnetic induction, or the like. Radio communication may include an IEEE802.11 series standard, an IEEE802.15 series standard (e.g., a Bluetooth technology and a cellular technology), a first-generation mobile communication technology, a second-generation mobile communication technology (e.g., an FDMA, a TDMA, an SDMA, a CDMA, and an SSMA), a general packet radio service technology, a third-generation mobile communication technology (e.g., a CDMA2000, a WCDMA, a TD-SCDMA, and a WiMAX), a fourth-generation mobile communication technology (e.g., a TD-LTE and an FDD-LTE), a satellite communication (e.g., a GPS technology), a near field communication (NFC) technology, and other technologies operating in an ISM band (e.g., 2.4 GHz). A free space optical communication may include a visible light, an infrared signal, etc. An acoustic communication may include a sound wave, an ultrasonic signal, etc. An electromagnetic induction may include a near field communication technology and the like. The examples described above are for illustrative purposes only. The media for wireless connection may be other types, such as a Z-wave technique, other charged civilian radiofrequency bands, military radiofrequency bands, etc. For example, the bone conduction speaker 100 may obtain the sound signal from other devices through Bluetooth.

The vibration component 104 may generate mechanical vibration. A generation of the vibration may be accompanied by an energy conversion. The bone conduction speaker 100 may convert a signal containing the sound information into a mechanical vibration by using the magnetic circuit component 102 and the vibration component 104. The conversion process may involve a coexistence and interconversion of energy of various types. For example, an electrical sound signal may be directly converted into a mechanical vibration through a transducer to generate sound. As another example, the sound information may be included in an optical signal, and a specific transducer may convert the optical signal into a vibration signal. Other types of energy that may coexist and convert during the operation of the transducer may include thermal energy, magnetic field energy, etc. According to the energy conversion way, the transducer may include a moving coil type, an electrostatic type, a piezoelectric type, a moving iron type, a pneumatic type, an electromagnetic type, etc. A frequency response range and sound quality of the bone conduction earphone 100 may be affected by the vibration component 104. For example, in a moving coil transducer, the vibrating component 104 may include a wound cylindrical coil and a vibrating body (for example, a vibrating piece). The cylindrical coil driven by a signal current may drive the vibrating body to vibrate and generate sound in the magnetic field. An expansion and a contraction of a material of the vibrating body, a deformation, a size, a shape, and a fixing method of a fold, a magnetic density of the permanent magnets, or the like, may affect the sound quality of the bone conduction speaker 100. The vibrator in the vibration component 104 may be a mirror-symmetric structure, a center-symmetric structure, or an asymmetric structure. The vibrating body may be provided with an intermittent hole-like structure, which enables the vibrating body to move more under the same input energy, so that the bone conduction speaker may achieve higher sensitivity and the output power of vibration and sound may be improved. The vibrating body may be a torus or a torus-like structure. The torus may be provided with a plurality of struts converging toward the center of the torus, and a count of the struts may be equal to two or more. In some embodiments, the vibration component 104 may include a coil, a vibration plate, a vibration transmission sheet, or the like.

The case 106 may transmit a mechanical vibration to the human body to enable the human body to hear the sound. The case 106 may constitute a sealed or non-sealed accommodating space, and the magnetic circuit component 102 and the vibration component 104 may be disposed inside the case 106. The case 106 may include a case panel. The case panel may be directly or indirectly connected to the vibration component 104. The mechanical vibration of the vibration component 104 may be transmitted to the auditory nerve via a bone, so that the human body can hear the sound.

The connection component 108 may connect and support the magnetic circuit component 102, the vibration component 104 and/or the case 106. The connection component 108 may include one or more connectors. The one or more connectors may connect the case 106 to one or more structures in the magnetic circuit component 102 and/or the vibration component 104.

The above description of the bone conduction speaker may be only a specific example, and should not be regarded as the only feasible implementation solution. Obviously, for those skilled in the art, after understanding the basic principle of bone conduction speaker, it is possible to make various modifications and changes in the form and details of the specific means and steps for implementing bone conduction speaker without departing from this principle, but these modifications and changes are still within the scope described above. For example, the bone conduction speaker 100 may include one or more processors, the one or more processors may execute one or more algorithms for processing sound signals. The algorithms for processing sound signals may modify or strengthen the sound signal. For example, a noise reduction, an acoustic feedback suppression, a wide dynamic range compression, an automatic gain control, an active environment recognition, an active noise reduction, a directional processing, a tinnitus processing, a multi-channel wide dynamic range compression, an active howling suppression, a volume control, or other similar or any combination of the above processing may be performed on sound signals. These amendments and changes are still within the protection scope of the present disclosure. As another example, the bone conduction speaker 100 may include one or more sensors, such as a temperature sensor, a humidity sensor, a speed sensor, a displacement sensor, or the like. The sensor may collect user information or environmental information.

Figure 2:
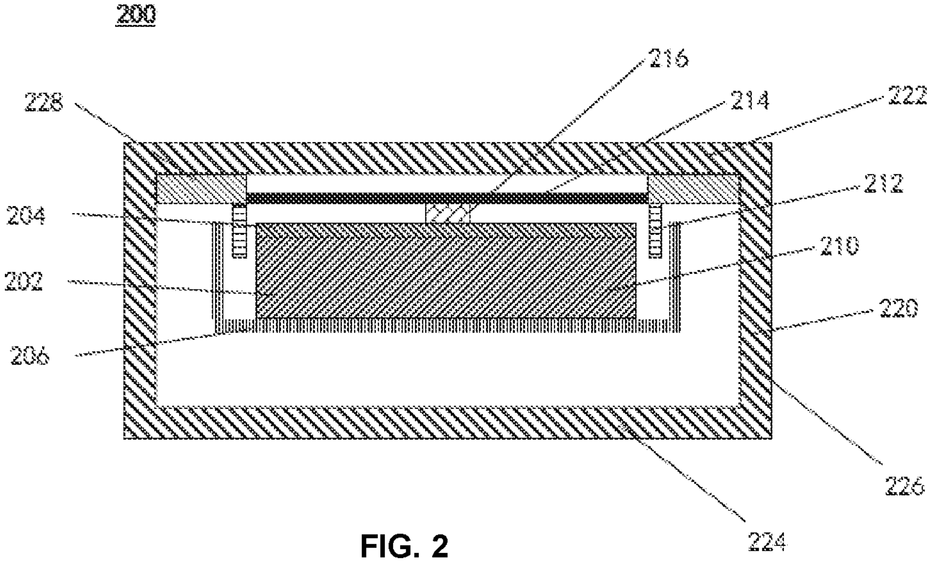
FIG. 2 is a longitudinal cross-sectional view of the bone conduction earphone according to some embodiments of the present disclosure.

FIG. 2 is a longitudinal cross-sectional view of the bone conduction earphone 200 according to some embodiments of the present disclosure. As shown in FIG. 2, the bone conduction earphone 200 may include a magnetic circuit component 210, a coil 212, a vibration transmission sheet 214, a connection piece 216, and a case 220.

The magnetic circuit component 210 may include a first magnetic element 202, a first magnetically conductive element 204, and a second magnetically conductive element 206. As used herein, a magnetic element described in the present disclosure refers to an element that may generate a magnetic field, such as a magnet. The magnetic element may have a magnetization direction, and the magnetization direction may refer to a magnetic field direction inside the magnetic element. The first magnetic element 202 may include one or more magnets. In some embodiments, a magnet may include a metal alloy magnet, a ferrite, or the like. The metal alloy magnet may include neodymium iron boron, samarium cobalt, aluminum nickel cobalt, iron chromium cobalt, aluminum iron boron, iron carbon aluminum, or the like, or a combination thereof. The ferrite may include a barium ferrite, a steel ferrite, a manganese ferrite, a lithium manganese ferrite, or the like, or a combination thereof.

The lower surface of the first magnetic guide element 204 may be connected with the upper surface of the first magnetic element 202. The second magnetically conductive element 206 may be a concave structure including a bottom wall and a side wall. An inner side of the bottom wall of the second magnetically conductive element 206 may be connected to the first magnetic element 202. The side wall may surround the first magnetic element 202, and form a magnetic gap between the first magnetic element 202 and the second magnetically conductive element 206. It should be noted that a magnetic guide element used herein may also be referred to as a magnetic field concentrator or iron core. The magnetic guide element may adjust the distribution of the magnetic field (e.g., the magnetic field generated by the first magnetic element 202). The magnetic guide element may be made of a soft magnetic material. In some embodiments, the soft magnetic material may include a metal material, a metal alloy, a metal oxide material, an amorphous metal material, or the like, for example, an iron, an iron-silicon based alloy, an iron-aluminum based alloy, a nickel-iron based alloy, an iron-cobalt based alloy, a low carbon steel, a silicon steel sheet, a silicon steel sheet, a ferrite, or the like. In some embodiments, the magnetic guide element may be manufactured by a way of casting, plastic processing, cutting processing, powder metallurgy, or the like, or any combination thereof. The casting may include sand casting, investment casting, pressure casting, centrifugal casting, etc. The plastic processing may include rolling, casting, forging, stamping, extruding, drawing, or the like, or any combination thereof. The cutting processing may include turning, milling, planning, grinding, etc. In some embodiments, the processing means of the magnetic guide element may include a 3D printing, a CNC machine tool, or the like. The connection means between the first magnetic guide element 204, the second magnetic guide element 206, and the first magnetic element 202 may include gluing, clamping, welding, riveting, screwing, or the like, or any combination thereof.

The coil 212 may be disposed in the magnetic gap between the first magnetic element 202 and the second magnetically conductive element 206. In some embodiments, the coil 212 may transmit a signal current. The coil 212 may be in the magnetic field formed by the magnetic circuit component 210, and be subjected to an ampere force to drive the coil 212 to generate a mechanical vibration. At the same time, the magnetic circuit component 210 may receive a reaction force opposite to the coil.

One end of the vibration transmission sheet 214 may be connected to the magnetic circuit component 210, and the other end may be connected to the case 220. In some embodiments, the vibration transmitting sheet 214 may be an elastic member. Elasticity of the elastic member may be determined by the material, thickness, and structure of the vibration transmission sheet 214. The material of the first vibration conductive plate 214 may include but is not limited to, steel (including but not limited to stainless steel, carbon steel), light alloy (including but not limited to aluminum alloy, beryllium copper, magnesium alloy, titanium alloy), and plastic (including but not limited to high molecular polyethylene, blown nylon, engineering plastics), or other single or composite materials capable of achieving the same performance. The composite materials may include, for example, but are not limited to, glass fibers, carbon fibers, boron fibers, graphite fibers, graphene fibers, silicon carbide fibers, aramid fibers, or other composites of organic and/or inorganic materials (such as various types of glass fibers composed of glass fiber strengthen and unsaturated polyester, epoxy resin, or phenolic resin matrix). In some embodiments, a thickness of the vibration transmission sheet 214 may be not less than 0.005 millimeter (mm). Preferably, the thickness may be between 0.005 mm and 3 mm. More preferably, the thickness may be between 0.01 mm and 2 mm. More preferably, the thickness may be between 0.01 mm and 1 mm. More preferably, the thickness may be between 0.02 mm and 0.5 mm. In some embodiments, the vibration-transmitting sheet 214 may be an elastic structure. The elastic structure itself may be an elastic structure due to its elasticity, even if a material of the elastic structure is hard, so that the vibration transmission sheet 214 itself has an elasticity. For example, the vibration transmission sheet 214 may be made into a spring-like elastic structure. In some embodiments, a structure of the vibration transmission sheet 214 may be set as a ring or a ring-like structure. Preferably, the vibration transmission sheet 214 may include at least one ring. Preferably, the vibration transmission sheet 214 may include at least two rings, which are concentric rings or non-concentric rings. The at least two struts may be connected through at least two struts, which radiate from an outer ring to a center of an inner ring. More preferably, the vibration transmission sheet 214 may include at least one elliptical ring. More preferably, the vibration transmission sheet 214 may include at least two elliptical rings, wherein different elliptical rings may have different radii of curvature. The elliptical rings may be connected through a strut. More preferably, the vibration-transmitting sheet 214 may include at least one square ring. The structure of the vibration transmission sheet 214 may also be set into a sheet shape. Preferably, a hollow pattern may be provided on the sheet-shaped vibration transmission sheet 214, wherein an area of the hollow pattern is not less than an area without the hollow pattern. In the above description, the materials, thickness, and structure may be combined into different vibration conducting sheets. For example, a ring-shaped vibration conductive plate may have different thickness distributions. Preferably, the thickness of the support rod(s) may be equal to the thickness of the ring(s). Further preferably, the thickness of the support rod(s) may be greater than the thickness of the ring(s). More preferably, the thickness of the inner ring may be greater than the thickness of the outer ring. In some embodiments, a part of the vibration transmission sheet 214 may be connected to the magnetic circuit component 210, and a part of the vibration transmission sheet 214 may be connected to the case 220. Preferably, the vibration transmission sheet 214 may be connected to the first magnetically conductive element 204. In some embodiments, the vibration transmission sheet 214 may be connected to the magnetic circuit component 210 and the case 220 by glue. In some embodiments, the vibration transmitting sheet 214 may be fixedly connected to the case 220 by welding, clamping, riveting, threading (e.g., screw, threaded rod, stud, bolt), an interference connection, a clamp connection, a pin connection, a wedge key connection, and a molded connection.

In some embodiments, the vibration transmission sheet 214 may be connected to the magnetic circuit component 210 through the connecting member 216. In some embodiments, a bottom end of the connecting member 216 may be fixed on the magnetic circuit component 210, for example, be fixed on an upper surface of the first magnetically conductive element. In some embodiments, the connecting member 216 may have a top end opposite to the bottom surface, and the top end may be fixedly connected to the vibration transmission sheet 214. In some embodiments, the top end of the connecting member 216 may be glued on the vibration transmission sheet 214.

The case 220 has a case panel 222, a case back 224, and a case side 226. The case back 224 of the case 220 may be located on a side opposite to the case panel 222. The case back 224 and the case panel 222 may be disposed on two end surfaces of the case side 226. The case panel 222, the case back 224, and the case side 226 may form an overall structure with a certain accommodating space. In some embodiments, the magnetic circuit component 210, the coil 212, and the vibration transmission sheet 214 may be fixed inside the case 220. In some embodiments, the bone conduction earphone 200 may further include a case bracket 228, and the vibration transmission sheet 214 may be connected to the case 220 through the case bracket 228. In some embodiments, the coil 212 may be fixed on the case bracket 228 and drive the case 220 to vibrate through the case bracket 228. The case bracket 228 may be a part of the case 220 or a separate component, which may be directly or indirectly connected to the inside of the case 220. In some embodiments, the case bracket 228 may be fixed on an inner surface of the case side 226. In some embodiments, the case bracket 228 may be pasted to the case 220 by gluing, or may be fixed to the case 220 by stamping, injection molding, clamping, riveting, screwing, or welding.

In some embodiments, the bone conduction speaker 100 may also include an earphone fixing component (not shown in FIG. 2). The earphone fixing component may be fixedly connected to the case 220, and maintain a stable contact between the bone conductive speaker 100 and human tissues or bones to avoid shaking of the bone conductive speaker 100, thereby ensuring that the earphone may transmit sound stably. In some embodiments, the earphone fixing component may be an arc-shaped elastic member capable of forming a force that rebounds toward a center of the arc. A case 220 may be connected to each of two ends of the earphone fixing component, so as to make the case 220 at each end be in contact with the human tissues or bones. More descriptions regarding the earphone fixing component may be found elsewhere in the present disclosure. See, e.g., FIG. 16 and relevant descriptions thereof.

Figure 3:
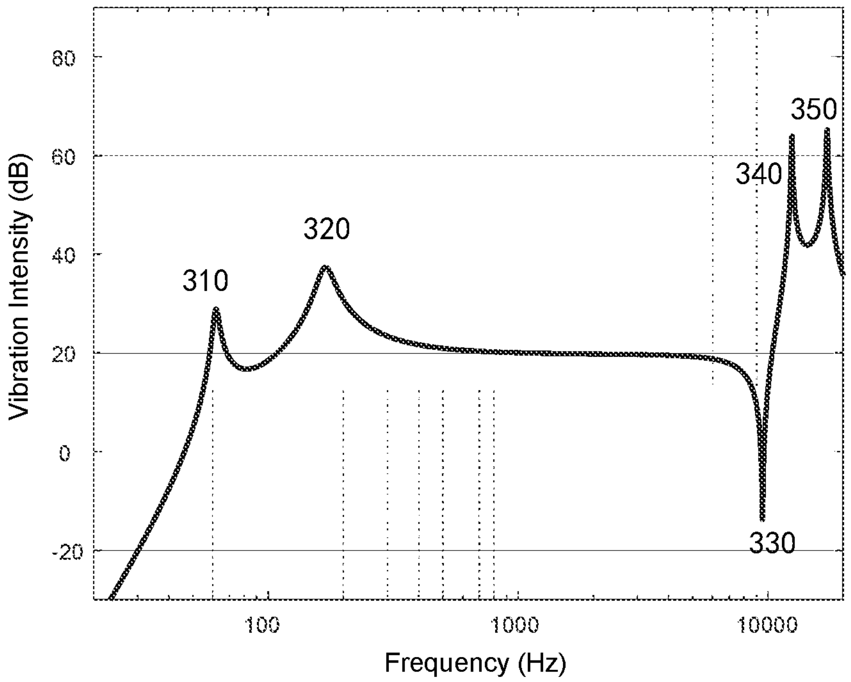
FIG. 3 is a diagram illustrating a partial frequency response curve of the bone conduction earphone according to some embodiments of the present disclosure.

FIG. 3 is a diagram illustrating a partial frequency response curve of the bone conduction earphone according to some embodiments of the present disclosure. The horizontal axis represents a vibration frequency, and the vertical axis represents a vibration intensity of the bone conduction speaker 200. As used herein, a vibration intensity may be expressed as a vibration acceleration of the bone conduction speaker 200. In some embodiments, in a frequency response range of 1000 hertz (Hz) to 10000 Hz, the flatter the frequency response curve is, the better the sound quality of the bone conduction speaker 200 may be. A structure of the bone conduction speaker 200, a design of the component, a material property, or the like, may all influence the frequency response curve. Generally, a low-frequency sound refers to a sound with a frequency less than 500 Hz, a middle-frequency sound refers to a sound within a range of 500 Hz to 4000 Hz, and a high-frequency sound refers to a sound with a frequency greater than 4000 Hz. As shown in FIG. 3, the frequency response curve of the bone conduction speaker 200 may have two resonance peaks (310 and 320) in a low frequency region. Further, the frequency response curve of the bone conduction speaker 200 may have a first high frequency valley 330, a first high frequency peak 340, and a second high frequency peak 350 in a high frequency region. The two resonance peaks (310 and 320) in the low-frequency region may be generated by a joint effect of the vibration transmission sheet 214 and the earphone fixing component. The first high-frequency valley 330 and the first high-frequency peak 340 may be caused by a deformation of the case side 226 at a high frequency. The second high-frequency peak 350 may be caused by a deformation of the case panel 222 at a high frequency.

Positions of the different resonance peaks and high-frequency peaks or high-frequency valleys may be related to the stiffness of the corresponding components. The stiffness may be a capacity of a material or structure to resist an elastic deformation when stressed. The stiffness may be related to a Young's modulus and a structural size of the material itself. The greater the stiffness is, the smaller the deformation of the structure when stressed may be. As mentioned above, the frequency response corresponding to a frequency range of 500 Hz to 6000 Hz may be especially critical for the bone conduction speaker. In the frequency range of 500 Hz to 6000 Hz, a sharp peak and a sharp valley may be undesirable, and the flatter the frequency response curve is, the better the sound quality of the earphones may be. In some embodiments, the peak and valley of the high frequency region may be adjusted to a higher frequency region by adjusting the stiffness of the case panel 222 and the case back 224. In some embodiments, the case bracket 228 may also affect the peak and valley of the high frequency region. The peak and valley of the high frequency region may be adjusted to a higher frequency region by adjusting the stiffness of the case bracket 228. In some embodiments, an effective frequency band of the frequency response curve of the bone conduction speaker may in at least 500 Hz to 1000 Hz, or 1000 Hz to 2000 Hz. More preferably, the effective frequency band may include 500 Hz to 2000 Hz. More preferably, the effective frequency band may include 500 Hz to 4000 Hz. More preferably, the effective frequency band may include 500 Hz to 6000 Hz. More preferably, the effective frequency band may include 100 Hz to 6000 Hz. More preferably, the effective frequency band may include 100 Hz to 10000 Hz. As used herein, the effective frequency band refers to a frequency band that is set according to a standard commonly used in the industry, for example, an IEC and a JIS. In some embodiments, there may be no peaks or valleys in the effective frequency band, a frequency width range of which exceeds ⅛ octave and the peak/valley value of which exceeds an average vibration intensity by 10 decibel (dB).

Figure 4:
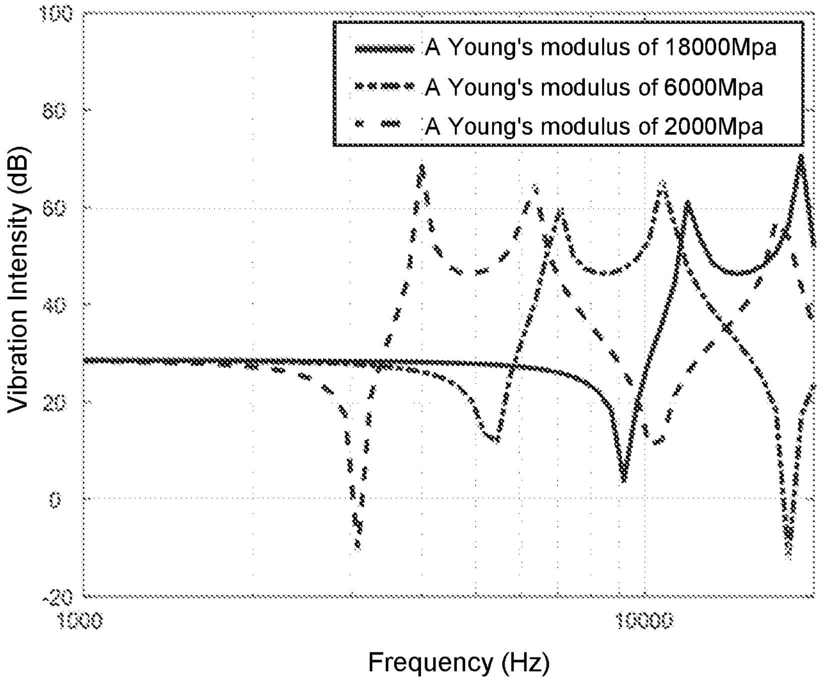
FIG. 4 is a diagram illustrating a partial frequency response curve of the bone conduction earphone, where a case of the bone construction earphone is made of materials with different Young's modulus, according to some embodiments of the present disclosure.

In some embodiments, the stiffness of different components (e.g., the case 220 and the case bracket 228) may be related to a Young's modulus, a thickness, a size, a volume, or the like, of the material. FIG. 4 is a diagram illustrating a partial frequency response curve of a bone conduction earphone, where a case of the bone construction earphone is made of materials with different Young's modulus, according to some embodiments of the present disclosure. It should be noted that, as described above, the case 220 may include the case panel 222, the case back 224, and the case side 226. The case panel 222, the case back 224, and the case side 226 may be made of the same material, or different materials. For example, the case back 224 and the case panel 222 may be made of the same material, and the case side 226 may be made of other materials. In FIG. 4, the case 220 may be made of the same material as that of the case panel 222, the case back 224, and the case side 226, so as to clearly explain an effect that a change of the Young's modulus of the material of the case produces on the frequency response curve of the bone conduction earphone. As shown in FIG. 4, by comparing frequency response curves of the case(s) 220 in the same size, which are made of three different materials with Young's modulus equal to 18000 megapascal (MPa), 6000 MPa, and 2000 MPa, it may be found, for the case(s) 220 in the same size, the greater the Young's modulus of the material of the case(s) 220 is, the greater the stiffness of the case(s) 220 may be, and the higher a frequency of a high-frequency peak in the frequency response curve may be. As used herein, the stiffness of a case may represent an elastic modulus of the case, that is, a shape change of the case when the case is stressed. For a case with a constant structure and a constant size, the stiffness of the case may increase as the Young's modulus of the material of the case increases. In some embodiments, a high-frequency peak of the frequency response curve may be adjusted to a higher frequency by adjusting the Young's modulus of the material of the case 220. In some embodiments, the Young's modulus of the material of the case 220 may be greater than 2000 MPa. Preferably, the Young's modulus of the material of the case 220 may be greater than 4000 MPa. Preferably, the Young's modulus of the material of the case 220 may be greater than 8000 MPa. Preferably, the Young's modulus of the material of the case 220 may be greater than 12000 MPa. More preferably, the Young's modulus of the material of the case 220 may be greater than 15000 Mpa. More preferably, the Young's modulus of the material of the case 220 may be greater than 18000 MPa.

In some embodiments, by adjusting the stiffness of the case 220, the frequency of the high-frequency peak in the frequency response curve of the bone conduction earphone may be not less than 1000 Hz. Preferably, the frequency of the high-frequency peak may be not less than 2000 Hz. Preferably, the frequency of the high-frequency peak may be not less than 4000 Hz. Preferably, the frequency of the high frequency peak may be not less than 6000 Hz. More preferably, the frequency of the high frequency peak may be not less than 8000 Hz. More preferably, the frequency of the high frequency peak may be not less than 10000 Hz. More preferably, the frequency of the high frequency peak may be not less than 12000 Hz. More preferably, the frequency of the high frequency peak may be not less than 14000 Hz. More preferably, the frequency of the high frequency peak may be not less than 16000 Hz. More preferably, the frequency of the high frequency peak may be not less than 18000 Hz. Still more preferably, the high-frequency peak frequency may be not less than 20000 Hz. In some embodiments, by adjusting the stiffness of the case 220, the frequency of the high-frequency peak in the frequency response curve of the bone conduction earphone may be out of a hearing range of a human ear. In some embodiments, by adjusting the stiffness of the case 220, the frequency of the high-frequency peak in the frequency response curve of the earphone may be within the hearing range of the human ear. In some embodiments, when there are a plurality of high-frequency peaks/valleys, by adjusting the stiffness of the case 220, the frequencies of the one or more high-frequency peak/valley in the frequency response curve of the bone conduction earphone may be out of the hearing range of the human ear, and the frequencies of one or more of the other high-frequency peaks/valleys may be within the hearing range of the human ear. For example, the frequency of the second high-frequency peak 350 may be out of the hearing range of the human ear, and the frequencies of the first high-frequency valley 330 and the first high-frequency peak 340 may be within the hearing range of the human ear.

In some embodiments, a design of the connection between the case panel 222, the case back 224, and the case side 226 may ensure that the case 220 has greater stiffness. In some embodiments, the case panel 222, the case back 224, and the case side 226 may be integrally formed. In some embodiments, the case back 224 and the case side 226 may be an integrally formed structure. The case panel 222 may be directly pasted to the case side 226 by gluing, or be fixed to the case side 226 by clamping, welding, or screwing. The gluing may be performed by glue with strong viscosity and high hardness. In some embodiments, the case panel 222 and the case side 226 may be an integrally formed structure, and the case back 224 may be directly pasted to the case side 226 by gluing, or may be fixed to the case side 226 by clamping, welding, or screwing. In some embodiments, the case panel 222, the case back 224, and the case side 226 may be independent components, which may be fixedly connected by gluing, clamping, welding, or screwing, or the like, or any combination thereof. For example, the case panel 222 may be connected to the case side 226 by glue, and the case back 224 may be connected to the case side 226 by clamping, welding, or screwing. Or the case back 224 may be connected to the case side 226 by gluing, and the case panel 222 may be connected to the case side 226 by clamping, welding, or screwing.

In some embodiments, an overall stiffness of the case 220 may be improved by selecting materials with the same or different Young's modulus. In some embodiments, the case panel 222, the case back 224, and the case side 226 may all be made of the same material. In some embodiments, the case panel 222, the case back 224, and the case side 226 may be made of different materials, which may have the same Young's modulus or different Young's moduli. In some embodiments, the case panel 222 and the case back 224 may be made of the same material, and the case side 226 may be made of another material. The Young's moduli of the two materials may be the same or different. For example, the material of the case side 226 may have a Young's modulus greater than that of the materials of the case panel 222 and the case back 224, or the material of the case side 226 may have a Young's modulus smaller than that of the materials of the case panel 222 and the case back 224. In some embodiments, the case panel 222 and the case side 226 may be made of the same material, and the case back 224 may be made of another material. The Young's moduli of the two materials may be the same or different. For example, the material of the case back 224 may have a Young's modulus greater than that of the material of the case panel 222 and the case side 226, or the material of the case back 224 may have a Young's modulus smaller than the material of the case panel 222 and the case side 226. In some embodiments, the case back 224 and the case side 226 may be made of the same material, and the case panel 222 may be made of other materials. The Young's modulus of the two materials may be the same or different. For example, the material of the case panel 222 may have a Young's modulus greater than that of the material of the case back 224 and the case side 226, or the material of the case panel 222 may have a Young's modulus smaller than that of the material of the case back 224 and the case side 226. In some embodiments, the materials of the case panel 222, the case back 224, and the case side 226 may be different. The three materials may have the same or different Young's moduli, and the three materials may have Young's moduli greater than 2000 MPa.

Figure 5:
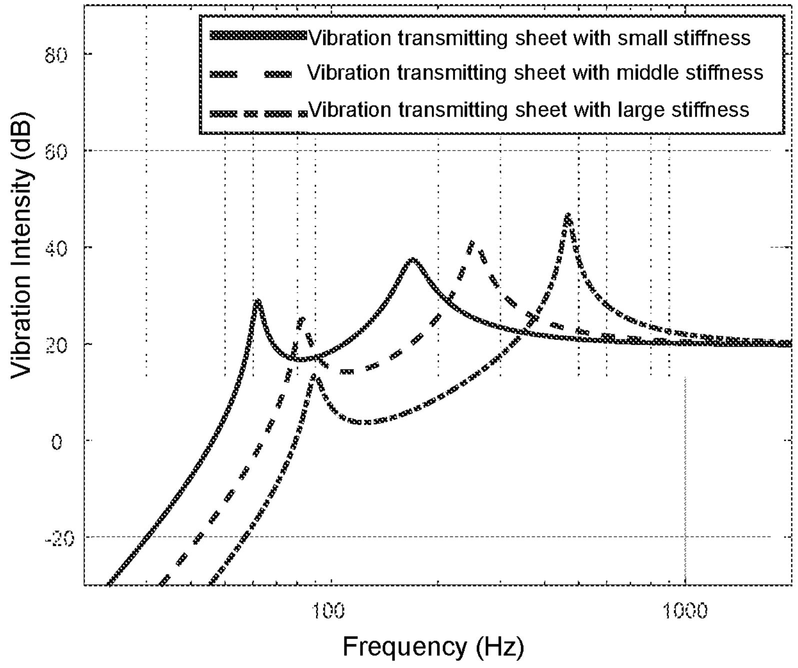
FIG. 5 is a diagram illustrating a partial frequency response curve of the bone conduction earphone, where a vibration transmitting sheet of the bone conduction earphone has different stiffness, according to some embodiments of the present disclosure.
Figure 6:
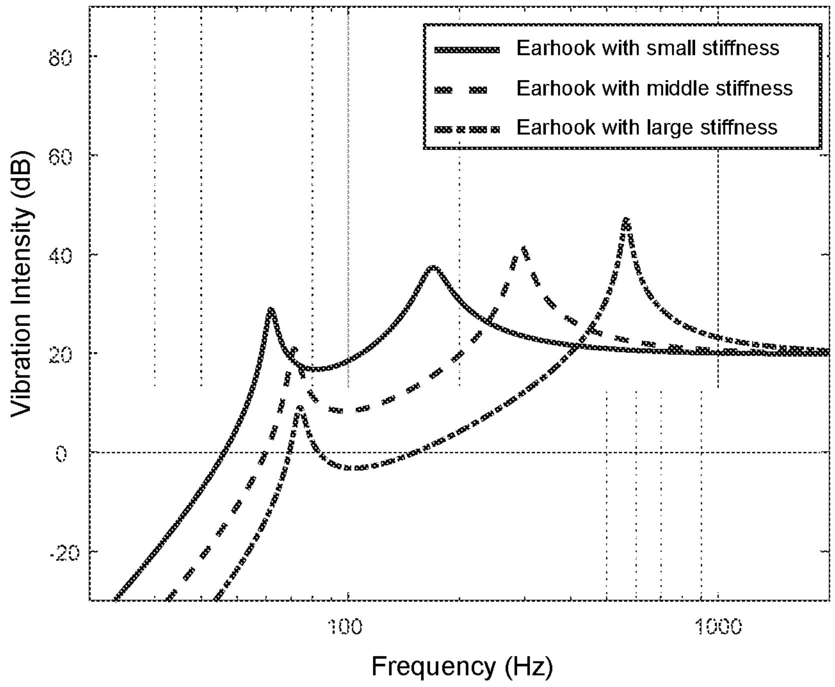
FIG. 6 is a diagram illustrating a partial frequency response curve of the bone conduction earphone, where an earphone fixing component of the bone conduction earphone has different stiffness, according to some embodiments of the present disclosure.

FIG. 5 is a diagram illustrating a partial frequency response curve of the bone conduction earphone, where a vibration transmitting sheet of the bone conduction earphone has different stiffness, according to some embodiments of the present disclosure. FIG. 6 is a diagram illustrating a partial frequency response curve of the bone conduction earphone, where an earphone fixing component of the bone conduction earphone has different stiffness, according to some embodiments of the present disclosure. As illustrated in FIGS. 5 and 6, the two resonance peaks in the low-frequency region may be related to the vibration transmission sheet and the earphone fixing component. The smaller the stiffness of the vibration transmission sheet 214 and the earphone fixing component is, the more obvious a response of the resonance peak in the low-frequency region may be. A greater stiffness of the vibration transmission sheet 214 and the earphone fixing component may make the resonance peak move to an intermediate frequency or a high frequency, resulting in a decrease in the sound quality. Therefore, the vibration transmission sheet 214 and the earphone fixing component with a smaller stiffness may have better elasticity, which improves the sound quality of the earphone. In some embodiments, by adjusting the stiffness of the vibration transmission sheet 214 and the earphone fixing component, the frequencies of the two resonance peaks in the low frequency region of the bone conduction earphone may be less than 2000 Hz. Preferably, the frequencies of the two resonance peaks in the low frequency region of the bone conduction earphone may be less than 1000 Hz. More preferably, the frequencies of the two resonance peaks in the low frequency region of the bone conduction earphone may be less than 500 Hz. In some embodiments, a difference between peak values of the two resonance peaks in the low frequency region of the bone conduction earphone may be not more than 150 Hz. Preferably, the peak values of the two resonance peaks in the low frequency region of the bone conduction earphone may be not more than 100 Hz. More preferably, a difference between the peak values of the two resonance peaks in the low frequency region of the bone conduction earphone may be not more than 50 Hz.

As mentioned above, by adjusting the stiffness of various components (for example, a case, a case bracket, a vibration transmission sheet, or an earphone fixing component) of the bone conduction earphone, the peak/valley in the high frequency region may be adjusted to a higher frequency, the low-frequency resonance peak may be adjusted to a lower frequency, so as to ensure a frequency response curve platform in a range of 500 Hz~6000 Hz, thereby improving the sound quality of the bone conduction earphone.

The bone conduction speaker may produce sound leakage during a vibration transmission. A vibration of an internal component of the bone conduction earphone 200 or the case may cause a variation of a volume of a surrounding air to generate a compressed area or a sparse area and propagate to a surrounding environment, resulting in a transmission of a sound to the surrounding environment. The transmission of a sound to the surrounding environment may enable a person other than a wearer of the bone conduction earphone 200 to hear the sound, that is, the sound leakage. The present disclosure may provide a solution to reduce the sound leakage of bone conduction earphone by changing the structure and stiffness of the case thereof.

Figure 7A:
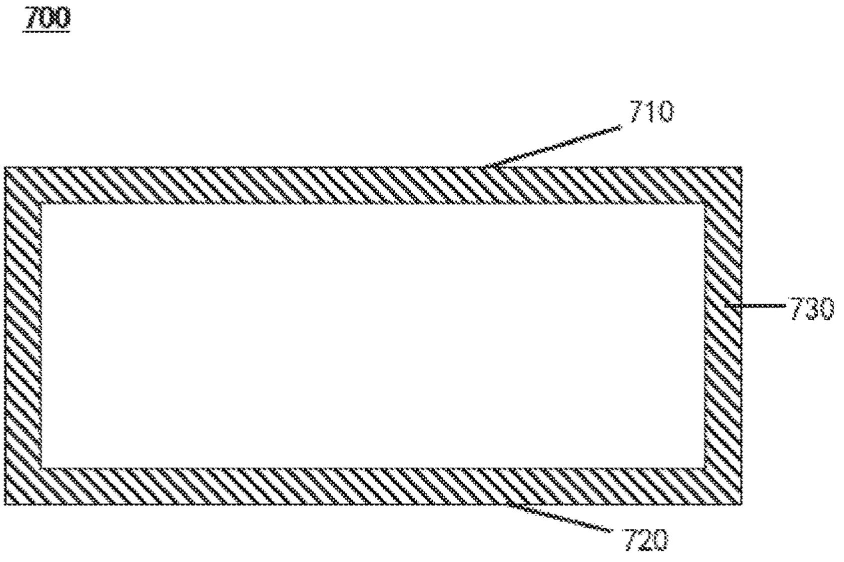
FIG. 7A is a longitudinal cross-sectional view of the case of the bone conduction earphone according to some embodiments of the present disclosure.

FIG. 7A is a longitudinal cross-sectional view of the case of the bone conduction earphone according to some embodiments of the present disclosure. As shown in FIG. 7A, the case 700 may include a case panel 710, a case back 720, and a case side 730. The case panel 710 may contact the human body and transmits a vibration of the bone conduction earphone to an auditory nerve of the human body. In some embodiments, when an overall stiffness of the case 700 is relatively large, the case panel 710 and the case back 720 may have the same or substantially the same vibration amplitude and phase within a certain frequency range, so that a first sound leakage signal generated by the case panel 710 and a second sound leakage signal generated by the case back 720 may have an overlapping. Since the case side 730 does not compress air, the case side 730 may not generate sound leakage. The overlapping may reduce the amplitude (s) of the first sound leakage wave or the second sound leakage wave, so as to reduce the sound leakage of the case 700. In some embodiments, the certain frequency range may include at least a portion with a frequency greater than 500 Hz. Preferably, the certain frequency range may include at least a portion with a frequency greater than 600 Hz. Preferably, the certain frequency range may include at least a portion with a frequency greater than 800 Hz. Preferably, the certain frequency range may include at least a portion with a frequency greater than 1000 Hz. Preferably, the certain frequency range may include at least a portion with a frequency greater than 2000 Hz. More preferably, the certain frequency range may include at least a portion with a frequency greater than 5000 Hz. More preferably, the certain frequency range may include at least a portion with a frequency greater than 8000 Hz. Further preferably, the certain frequency range may include at least a portion with a frequency greater than 10000 Hz. More descriptions regarding the structure of the case may be found elsewhere in the present disclosure. See, e.g., FIGS. 22A-22C and relevant descriptions thereof.

Figure 7B:
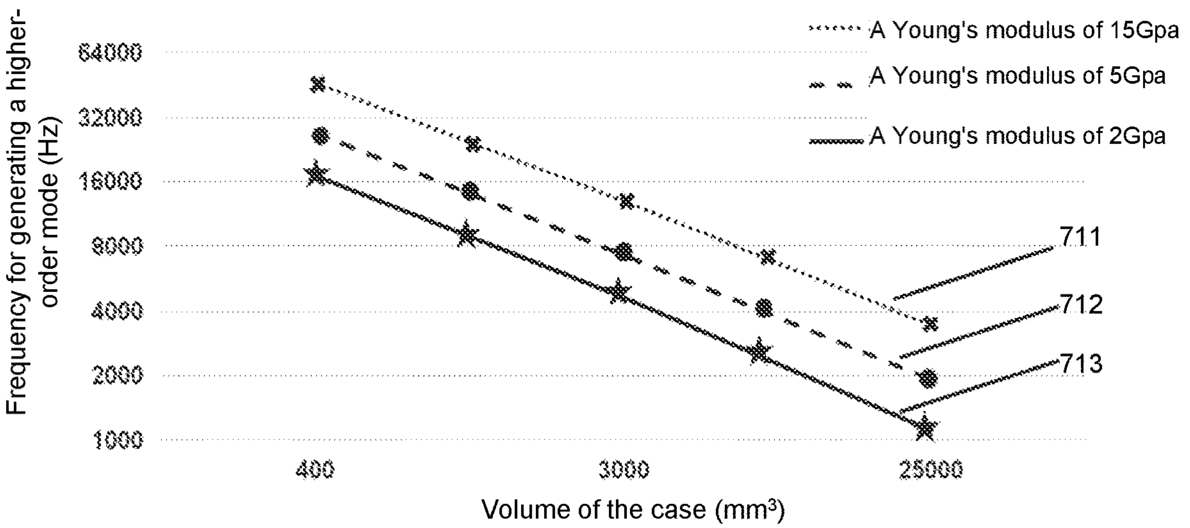
FIG. 7B is a diagram illustrating a relationship between a frequency for generating a higher-order mode and a volume of the case and a Young's modulus of the material according to some embodiments of the present disclosure.

When the frequency range includes a frequency exceeding a threshold, a specific part of the case 700 (for example, the case panel 710, the case back 720, and the case side 730) may generate a higher-order mode when vibrating. That is, different points on the certain part may have inconsistent vibrations). In some embodiments, a frequency for generating the higher-order mode may be higher by adjusting a volume and a material of the case 700. FIG. 7B is a diagram illustrating a relationship between the frequency for generating the higher-order mode and the volume of the case and a Young's modulus of the material according to some embodiments of the present disclosure. For the convenience of description, different parts on the case 700 (e.g., the case panel 710, the case back 720, and the case side 730) are made of materials having the same Young's modulus herein. It should be understood that, for those skilled in the art, when different parts of the case 700 are made of materials with different Young's modulus (e.g., an embodiment shown elsewhere in the present disclosure), a similar result may still be obtained. As shown in FIG. 7B, the dotted line 711 may indicate a relationship between the frequency for the case 700 to generate the high-order mode and the volume of the case 700, when the Young's modulus of the material is 15 gigapascals (GPa). Specifically, when the Young's modulus of the material is 15 GPa, the smaller the volume of the case 700 is, the higher the frequency for generating the higher-order mode may be. For example, when the volume of the case 700 is 25000 cubic millimetre ($mm^3$), the frequency for the case 700 to generate the high-order mode may be around 4000 Hz. As another example, when the volume of the case 700 is 400 $mm^3$, the frequency for the case 700 to generate the high-order mode is above 32000 Hz. Similarly, the dashed line 712 may indicate a relationship between the frequency for the case 700 to generate the high-order mode and the volume of the case 700, when the Young's modulus of the material is 5 GPa. The solid line 713 may indicate a relationship between the frequency for the case 700 to generate the high-order mode and the volume of the case 700, when the Young's modulus of the material is 2 GPa. Thus, a smaller volume of the case and a greater Young's modulus of the material may correspond to a higher frequency for the case 700 to generate the higher-order modes. In some embodiments, the volume of the case 700 may be within a range of 400 $mm^3$-6000 $mm^3$, and the Young's modulus of the material may be within a range of 2 GPa-18 GPa. Preferably, the volume of the case 700 may be within a range of 400 $mm^3$-5000 $mm^3$, and the Young's modulus of the material may be within a range of 2 GPa-10 GPa. More preferably, the volume of the case 700 may be within a range of 400 $mm^3$-3500 $mm^3$, and the Young's modulus of the material may be within a range of 2 GPa-6 GPa. More preferably, the volume of the case 700 may be within a range of 400 $mm^3$-3000 $mm^3$, and the Young's modulus of the material may be within a range of 2 GPa-5.5 GPa. More preferably, the volume of the case 700 may be within a range of 400 $mm^3$-2800 $mm^3$, and the Young's modulus of the material may be within a range of 2 GPa-5 GPa. More preferably, the volume of the case 700 may be within a range of 400 $mm^3$-2000 $mm^3$, and the Young's modulus of the material may be within a range of 2 GPa-Between 4 GPa. Further preferably, the volume of the case 700 may be within a range of 400 $mm^3$-1000 $mm^3$, and the Young's modulus of the material may be within a range of 2 GPa-3 GPa.

Figure 7C:
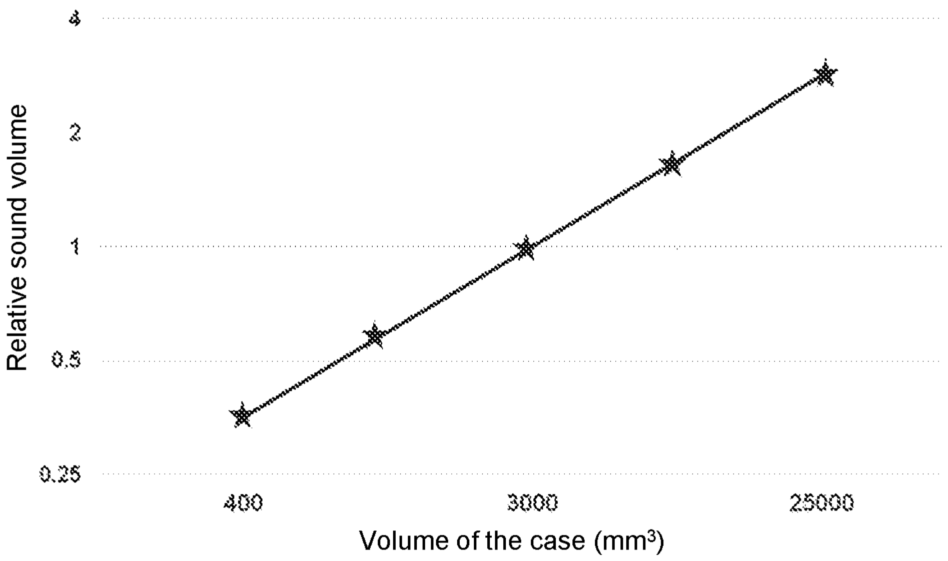
FIG. 7C is a diagram illustrating a relationship between a sound volume of the bone conduction speaker and the volume of the case according to some embodiments of the present disclosure.

It should be known that, a greater volume of the case 700 may enable a larger magnetic circuit system to be accommodated inside the case 700, so as to improve the sensitivity of the bone conduction speaker. In some embodiments, the sensitivity of the bone conduction speaker may be reflected by a sound volume of the bone conduction speaker under a certain input signal. When the same signal is inputted, the greater the sound volume the bone conduction speaker produces, the higher the sensitivity of the bone conduction speaker may be. FIG. 7C is a diagram illustrating a relationship between the sound volume of the bone conduction earphone and the volume of the case according to some embodiments of the present disclosure. As shown in FIG. 7C, the horizontal axis represents the volume of the case, and the vertical axis represents the sound volume (for example, a sound volume relative to a reference volume, that is, the relative sound volume) of the bone conduction speaker under the same input signal. The sound volume of the bone conduction speaker may increase as the volume of the case increases. For example, when the volume of the case is equal to 3000 $mm^3$, the relative sound volume of the bone conduction speaker is 1; and when the volume of the case volume is equal to 400 $mm^3$, the relative sound volume of the bone conduction speaker is between 0.25 and 0.5. In some embodiments, in order to improve the sensitivity (the sound volume) of the bone conduction speaker, the volume of the case may be 2000 $mm^3$-6000 $mm^3$. Preferably, the volume of the case may be 2000 $mm^3$-5000 $mm^3$. Preferably, the volume of the case may be 2800 $mm^3$-5000 $mm^3$. Preferably, the volume of the case may be 3500 $mm^3$-5000 $mm^3$. Preferably, the volume of the case may be 1500 $mm^3$-3500 $mm^3$. Preferably, the volume of the case may be 1500 $mm^3$-2500 $mm^3$.

Figure 8A:
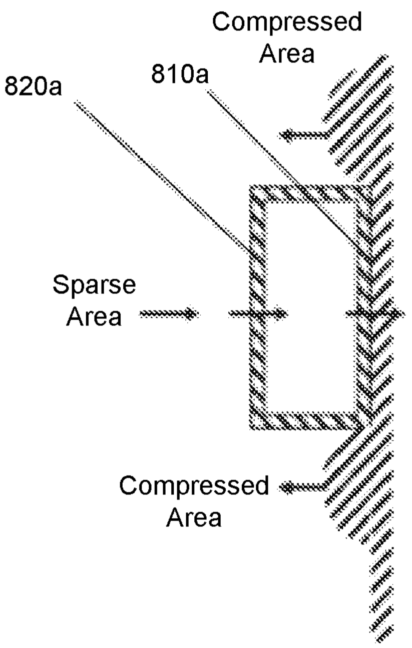
FIG. 8A is a schematic diagram illustrating a reduction of sound leakage using the case according to some embodiments of the present disclosure.
Figure 8B:
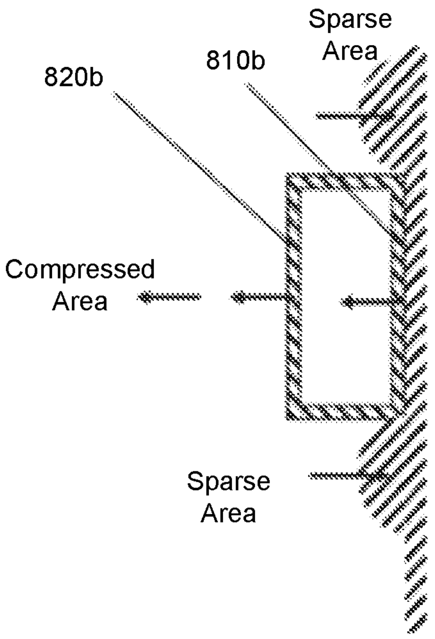
FIG. 8B is another schematic diagram illustrating the reduction of sound leakage using the case according to some embodiments of the present disclosure.

FIG. 8A is a schematic diagram for illustrating a reduction of reducing sound leakage using the case according to some embodiments of the present disclosure. FIG. 8B is another schematic diagram illustrating the reduction of sound leakage using the case according to some embodiments of the present disclosure. As shown in FIG. 8A, the case may include a case panel 810*a* and a case back 820*a*. As shown in FIG. 8B, the case may include a case panel 810*b* and a case back 820*b*. The case panels 810*a* and 810*b* may represent the case panel 710 of the case 700 in different scenarios, and the case backs 820*a* and 820*b* may represent the case back 720 of the case 700 in different scenarios. When the bone conduction speaker is in an operating state, the case panel 810*a* may come into contact with the human body and perform a mechanical vibration. In some embodiments, the case panel 710 may be in contact with the skin of a person's face, and squeeze the contacted skin to a certain degree, so that skin around the case panel 710 protrudes outward and deforms. As shown in FIG. 8A, when vibrating, the case panel 810*a* may move toward the face of the person, squeeze the skin, push the deformed skin around the case panel 810*a* to protrude outward, and compress the air around the case panel 810*a*. As shown in FIG. 8B, when the case panel 810*b* moves away from the person's face, a sparse area may be formed between the case panel 810*b* and the skin of the person's face, so as to absorb air around the case panel 810*b*. The compression and absorption of air may lead to a continuous change of a volume of the air around the case panel 710, which causes the air around the case panel 710 to continuously generate a compressed area or a sparse area and propagate to a surrounding environment, and transmits sound to the surrounding environment, thereby generating the sound leakage. If the stiffness of the case 700 is large enough, the case back 720 may vibrate together with the case panel 710, at the same magnitude and direction of the vibration. When the case panel 810*a* moves to a person's face, the case back 820*a* may also move to the person's face, and the sparse area of the air may be generated around the case back 820*a*. That is, when the air is compressed around the case panel 810*a*, the air may be absorbed around the case back 820*a*. When the case panel 810*b* moves away from the person's face, the case back 820*b* may also move away from the person's face, and the compressed area of air may be generated around the case back 820*b*. That is, when the air is absorbed around the case panel 810*b*, the air may be compressed around the case back 820*b*. The opposite effects of the case back 720 and the case panel 710 on the air may cancel out an effect of the bone conduction earphone on the surrounding air, which make the external sound leakage of the case panel 710 and the case back 720 cancel out each other, thereby significantly reducing the sound leakage outside the case 700. That is to say, an overall stiffness of the case 700 may be improved to ensure that the case back 720 and the case panel 710 have the same vibration. If the case back 720 does not push the air, no sound leakage may occur, so that the sound leakage of the case back 720 and the case panel 710 may be cancelled out by each other, thereby greatly reducing the sound leakage outside the case 700.

In some embodiments, the stiffness of the case 700 may be large enough to ensure that the case panel 710 and the rear surface 720 of the case have the same vibration, so that the sound leakage outside the case 700 may be cancelled out, thereby significantly reducing the sound leakage. In some embodiments, the stiffness of the case 700 may be large, so as to reduce the sound leakage of the case panel 710 and the case back 720 in a mid-low frequency range.

In some embodiments, the stiffness of the case 700 may be improved by increasing the stiffness of the case panel 710, the case back 720, and the case side 730. The stiffness of the case panel 710 may be related to a Young's modulus, a size, a weight, or the like of its material. The greater the Young's modulus of the material is, the greater the stiffness of the case panel 710 may be. In some embodiments, the material of the case panel 710 may have a Young's modulus greater than 2000 Mpa. Preferably, the material of the case panel 710 may have a Young's modulus greater than 3000 Mpa. Preferably, the material of the case panel 710 may have a Young's modulus greater than 4000 Mpa. Preferably, the material of the case panel 710 may have a Young's modulus greater than 6000 Mpa. Preferably, the material of the case panel 710 may have a Young's modulus greater than 8000 Mpa. Preferably, the material of the case panel 710 may have a Young's modulus greater than 12000 Mpa. More preferably, the material of the case panel 710 may have a Young's modulus greater than 15000 MPa. More preferably, the material of the case panel 710 may have a Young's modulus greater than 18000 MPa. In some embodiments, the material of the case panel 710 may include, but is not limited to acrylonitrile butadiene styrene (ABS), polystyrene (PS), high impact polystyrene (HIPS), polypropylene (PP), polyethylene terephthalate (PET), polyester (PES), polycarbonate (PC), polyamide (PA), Polyvinyl chloride (PVC), polyurethanes (PU), polyvinylidene chloride, polyethylene (PE), polymethyl methacrylate (PMMA), polyetheretherketone (PEEK), phenolics (PF), urea-formaldehyde (UF), melamine-formaldehyde (MF), metal, alloy (e.g., aluminum alloy, chromium molybdenum steel, scandium alloy, magnesium alloy, titanium alloy, magnesium-lithium alloy, nickel alloy), glass fiber, carbon fiber, or the like, or any combination thereof. In some embodiments, the material of the case panel 710 may be any combination of materials such as the glass fiber and/or the carbon fiber with the PC and/or the PA. In some embodiments, the material of the case panel 710 may be made by mixing the carbon fiber and the PC according to a certain ratio. In some embodiments, the material of the case panel 710 may be made by mixing the carbon fiber, the glass fiber, and the PC according to a certain ratio. In some embodiments, the material of the case panel 710 may be made by mixing the glass fiber and the PC according to a certain ratio. In some alternative embodiments, the material of the case panel 710 may be made by mixing the glass fiber and the PA according to a certain ratio. By adding different proportions of the carbon fiber or the glass fiber, the stiffness of the resulting material may be different. For example, by adding 20% to 50% glass fiber, the Young's modulus of the material may reach 4000 MPa to 8000 MPa.

In some embodiments, the greater the thickness of the case panel 710 is, the greater the stiffness of the case panel 710 may be. In some embodiments, the thickness of the case panel 710 may be not less than 0.3 mm. Preferably, the thickness of the case panel 710 may be not less than 0.5 mm. More preferably, the thickness of the case panel 710 may be not less than 0.8 mm. More preferably, the thickness of the case panel 710 may be not less than 1 mm. However, as the thickness increases, the weight of the case 700 may also increase, which increases a self-weight of the bone conduction earphone, thereby affecting the sensitivity of the earphone. Therefore, the thickness of the case panel 710 may not be too large. In some embodiments, the thickness of the case panel 710 may not exceed 2.0 mm. Preferably, the thickness may not exceed 1.0 mm. More preferably, the thickness of the case panel 710 may not exceed 0.8 mm.

In some embodiments, the case panel 710 may be provided in different shapes. For example, the case panel 710 may be arranged in a rectangular shape, an approximately rectangular shape (that is, a racetrack shape, or a structure in which four corners of the rectangular shape are replaced by arc shapes), an oval shape, or any other shape. The smaller an area of the case panel 710 is, the greater the stiffness of the case panel 710 may be. In some embodiments, the area of the case panel 710 may be not greater than 8 $cm^2$. Preferably, the area of the case panel 710 may be not greater than 6 $cm^2$. Preferably, the area of the case panel 710 may be not greater than 5 $cm^2$. More preferably the area of the case panel 710 may be not greater than 4 $cm^2$. More preferably the area of the case panel 710 may be not greater than 2 $cm^2$.

Figure 9:
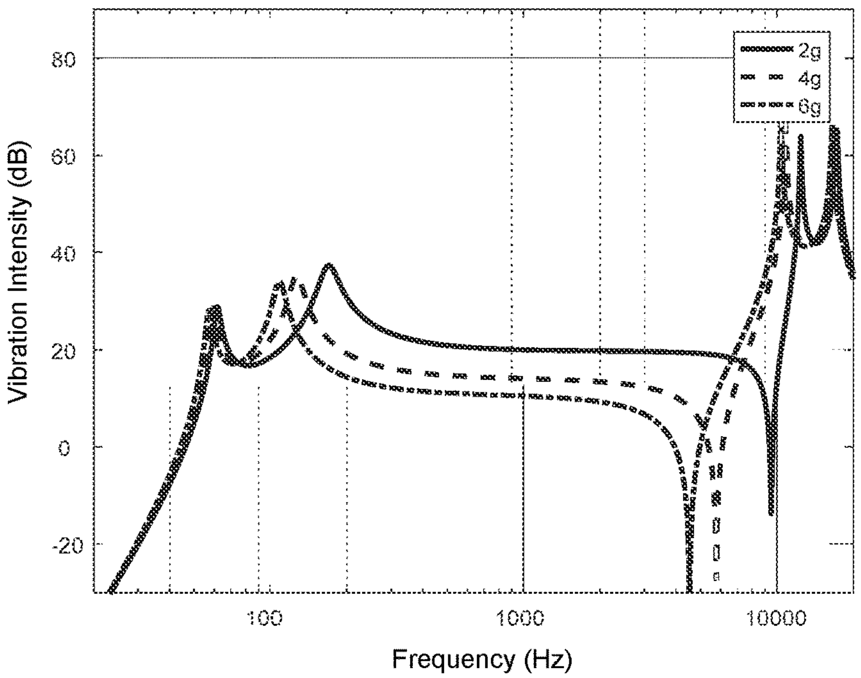
FIG. 9 is a diagram illustrating a partial frequency response curve of the bone conduction earphone, where the case of the bone conduction earphone has different weights according to some embodiments of the present disclosure.

In some embodiments, the stiffness of the case 700 may be achieved by adjusting a weight of the case 700. The heavier the weight of the case 700 is, the greater the stiffness of the case 700 may be. However, the heavier the weight of the case 700 may cause an increasing weight of the bone conduction earphone, which affects the wearing comfort of the bone conduction earphone. In addition, the heavier the weight of the case 700 is, the lower an entire sensitivity of the bone conduction earphone may be. FIG. 9 is a diagram illustrating a partial frequency response curve of the bone conduction earphone, where the case 700 of the bone conduction earphone has different weights according to some embodiments of the present disclosure. As shown in FIG. 9, when the weight of the case 700 is heavier, the frequency response curve of the high frequency moves to a low frequency direction as a whole, so that the peaks/valleys of the frequency response curve of the bone conduction earphone occur at middle and high frequencies, damaging the sound quality. In some embodiments, the weight of the case 700 may be less than or equal to 8 grams (g). Preferably, the weight of the case 700 may be less than or equal to 6 g. More preferably, the weight of the case 700 may be less than or equal to 4 g. More preferably, the weight of the case 700 may be less than or equal to 2 g.

In some embodiments, the stiffness of the case panel 710 may be improved by simultaneously adjusting any combination of the Young's modulus, the thickness, the weight, the shape, and the like of the case panel 710. For example, a desired stiffness of the case panel 710 may be obtained by adjusting the Young's modulus and the thickness of the case panel 710. As another example, the desired stiffness of the case panel 710 may be obtained by adjusting the Young's modulus, the thickness, and the weight of the case panel 710.

In some embodiments, the material of the case panel 710 may have a Young's modulus not less than 2000 MPa and a thickness greater than or equal to 1 mm. In some embodiments, the material of the case panel 710 may have a Young's modulus not less than 4000 MPa and a thickness not less than 0.9 mm. In some embodiments, the material of the case panel 710 may have a Young's modulus not less than 6000 MPa and a thickness not less than 0.7 mm. In some embodiments, the material of the case panel 710 may have a Young's modulus not less than 8000 MPa and a thickness not less than 0.6 mm. In some embodiments, the material of the case panel 710 may have a Young's modulus not less than 10000 MPa and a thickness not less than 0.5 mm. In some embodiments, the material of the case panel 710 may have a Young's modulus not less than 18000 MPa and a thickness not less than 0.4 mm.

Figure 10A:
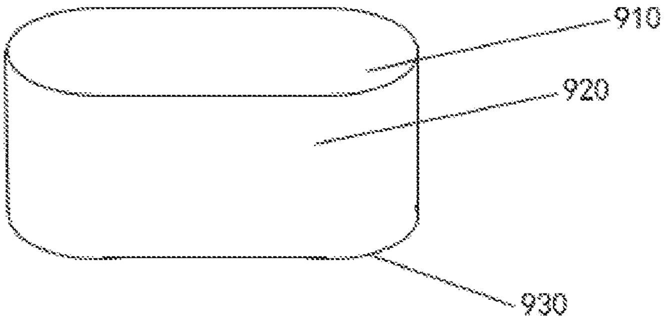
FIG. 10A is a schematic structural diagram illustrating the case of the bone conduction earphone case according to some embodiments of the present disclosure.
Figure 10B:
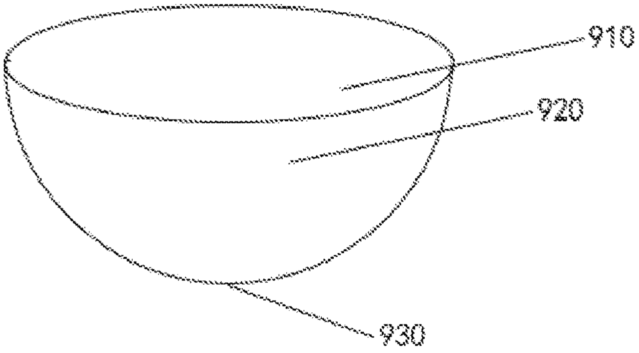
FIG. 10B is another schematic structural diagram illustrating the case of the bone conduction earphone according to some embodiments of the present disclosure.
Figure 10C:
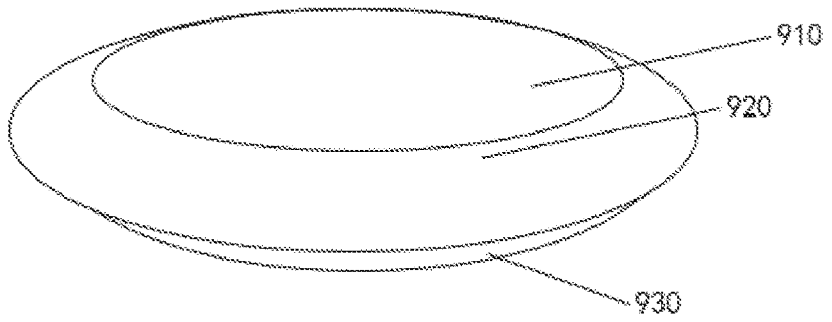
FIG. 10C is another schematic structural diagram illustrating the case of the bone conduction earphone according to some embodiments of the present disclosure.

In some embodiments, the case may be any shape capable of vibrating together as a whole, and is not limited to the shape shown in FIG. 7. In some embodiments, the case may be any shape, the case panel, and the case back of which have the same projected area on the same plane. FIG. 10A is a schematic structural diagram illustrating the case of the bone conduction earphone case according to some embodiments of the present disclosure. In some embodiments, as shown in FIG. 10A, the case 900 may be a cylinder, wherein the case panel 910 and the case back 930 may be upper and lower end surfaces of the cylinder, respectively, and the case side 920 may be a cylinder side. The projected area of the case panel 910 and the case back 930 on a cross section perpendicular to an axis of the cylinder may be equal. In some embodiments, a sum of the projected areas on the case back and the case side may be equal to a projected area of the case panel. FIG. 10B is another schematic structural diagram illustrating the case of the bone conduction earphone according to some embodiments of the present disclosure. For example, as shown in FIG. 10B, the case 900 may approximate to a hemispherical shape, wherein the case panel 910 may be a flat or curved surface, and the case side 920 may be a curved surface (e.g., a bowl-shaped curved surface). Taking a plane parallel to the case panel 910 as a projection plane, the case side 920 may be a plane or a curved surface with a projection area smaller than a projection area of the case panel 910. A sum of the projection areas of the case side 920 and the case back 930 may be equal to the projection area of the case panel 910. In some embodiments, the projection area of the case side facing a human body may be equal to the projected area of the case side facing away from the human body. FIG. 10C is another schematic structural diagram illustrating the case of the bone conduction earphone according to some embodiments of the present disclosure. For example, as shown in FIG. 10C, the case panel 910 and the case back 930 may be opposite curved surfaces, wherein the case side 920 may be a curved surface transitioning from the case panel 910 to the case back, and a part of the case side 920 and the case panel 910 may be located on the same side, and the other part of the case side 920 and the case back 930 may be located on the same side. Taking a cross section with the largest cross-sectional area as a projection plane, a sum of the projection areas of a part of the case side 920 and the case panel 910 may be equal to a sum of the projection areas of the other part of the case side 920 and the case back 930. In some embodiments, a difference between an area of the case panel and the case back may not exceed 50% of an area of the case panel. Preferably, the difference between the area of the case panel and the case back may not exceed 40% of the area of the case panel. More preferably, the difference between the area of the case panel and the case back may not exceed 30% of the area of the case panel. More preferably, the difference between the area of the case panel and the case back may not exceed 25% of the area of the case panel. More preferably, the difference between the area of the case panel and the case back may not exceed 20% of the area of the case panel. More preferably, the difference between the area of the case panel and the case back may not exceed 15% of the area of the case panel. More preferably, the difference between the area of the case panel and the case back may not exceed 12% of the area of the case panel. More preferably, the difference between the area of the case panel and the case back may not exceed 10% of the area of the case panel. More preferably, the difference between the area of the case panel and the case back may not exceed 8% of the area of the case panel. More preferably, the difference between the area of the case panel and the case back may not exceed 5% of the area of the case panel. More preferably, the difference between the area of the case panel and the case back may not exceed 3% of the area of the case panel. More preferably, the difference between the area of the case panel and the case back may not exceed 1% of the area of the case panel. More preferably, the difference between the area of the case panel and the case back may not exceed 0.5% of the area of the case panel. More preferably, the areas of the case panel and the case back may be equal.

Figure 11:
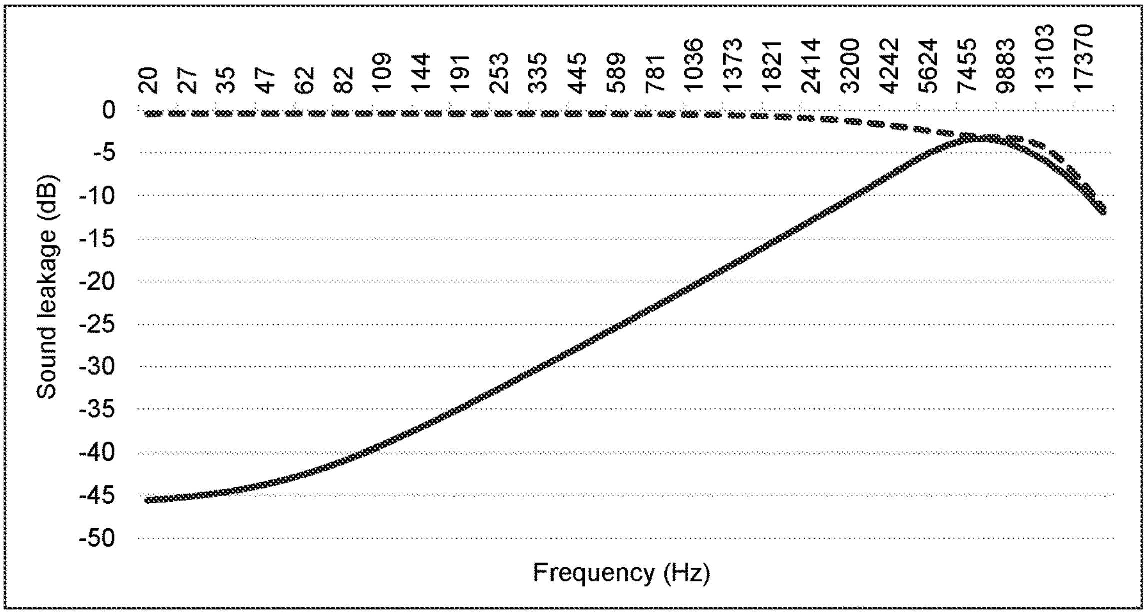
FIG. 11 is a diagram illustrating a comparison of the sound leakage effect between a traditional bone conduction earphone and the bone conduction earphone according to some embodiments of the present disclosure.

FIG. 11 is a diagram illustrating a comparison of the sound leakage effect between a traditional bone conduction speaker and the bone conduction speaker according to some embodiments of the present disclosure. The traditional bone conduction loudspeaker refers to a bone conduction loudspeaker composed of a case that is made of a material with a conventional Young's modulus. In FIG. 11, the dashed line is sound leakage curve of the traditional bone conduction speaker, and the solid line is the sound leakage curve of the bone conduction speaker provided in the present disclosure. The sound leakage of the traditional speaker at low frequency may be set to 0, that is, a curve of sound leakage cancellation of the bone conduction speaker may be drawn based on sound leakage cancellation of the traditional bone conduction speaker at low frequency. It may be seen that the bone conduction speaker provided in the present disclosure has a significantly better sound leakage cancellation effect than the traditional conduction speaker. The bone conduction speaker provided in the present disclosure may have a better sound leakage cancellation effect in a low frequency range (e.g., a frequency less than 100 Hz). For example, in the low frequency range, compared to the traditional bone conduction speaker, the bone conduction speaker provided in the present disclosure may reduce the sound leakage by 40 dB. As the frequency increases, the sound leakage cancellation effect may be weakened. For example, compared to the traditional bone conduction speaker, the bone conduction speaker provided in the present disclosure may reduce the sound leakage by 20 dB at 1000 Hz, and reduce the sound leakage by 5 dB at 4000 Hz. In some embodiments, a comparison test result between the traditional bone conduction speaker and the bone conduction speaker provided in the present disclosure may be obtained through simulation. In some embodiments, the comparison test result may be obtained through a physical testing. For example, the bone conduction speaker may be placed in a quiet environment, a signal current may be inputted into the bone conduction speaker, and a microphone may be arranged around the bone conduction speaker to receive a sound signal, thereby measuring a volume of the sound leakage.

As shown in FIG. 11, at low and middle frequencies, the case of the bone conduction speaker provided in the present disclosure may have a good vibration consistency, which may cancel out most of the sound leakage, and achieving a significantly better sound leakage reduction effect than the traditional bone conduction speaker. However, at a high vibration frequency, since it is difficult to maintain the whole case to vibrate together, there may still be a serious sound leakage. In addition, at the high frequency, even if the case is made of a material with a large Young's modulus, the case may inevitably be deformed. When the case panel and the case back are deformed and deformations thereof are inconsistent (for example, the case panel and the case back may have higher-order modes at the high frequency), the sound leakage generated by the case panel may not cancel out the sound leakage generated by the case back, which results in sound leakage of the bone conduction speaker. In addition, at the high frequency, the case side may also be deformed, increasing the deformations of the case panel and the case back of the case, which increases the sound leakage of the bone conduction speaker.

Figure 12:
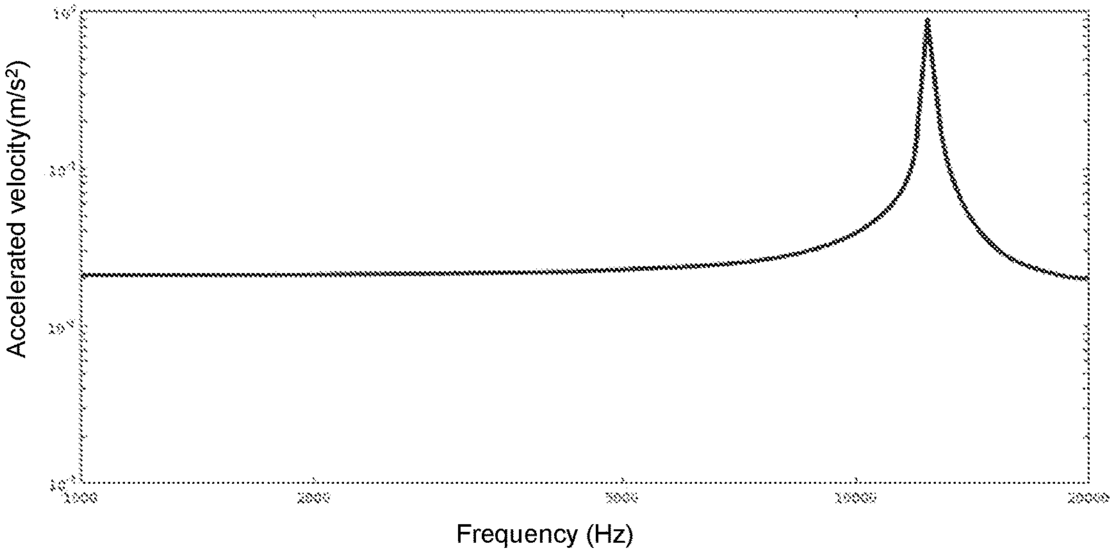
FIG. 12 is a diagram illustrating the frequency response curve generated by the case panel of the bone conduction earphone.

FIG. 12 is a diagram illustrating the frequency response curve generated by the case panel of the bone conduction earphone. At low and middle frequencies, the case may move as a whole, and the case panel and the case back may have the same size, speed, and direction of the vibration. At a high frequency, a high-order mode may occur to the case panel (that is, points on the case panel may have inconsistent vibrations), and a significant peak (as shown in FIG. 12) may occur in the frequency response curve due to the high-order mode. In some embodiments, the frequency of the peak may be adjusted by adjusting the Young's modulus, a weight, and/or a size of the material of the case panel. In some embodiments, the material of the case panel may have a Young's modulus greater than 2000 MPa. Preferably, the material of the case panel may have a Young's modulus greater than 4000 MPa. Preferably, the material of the case panel may have a Young's modulus greater than 6000 MPa. Preferably, the material of the case panel may have a Young's modulus greater than 8000 MPa. Preferably, the material of the case panel may have a Young's modulus greater than 12000 MPa. More preferably, the material of the case panel may have a Young's modulus greater than 15000 MPa. Further preferably, the material of the case panel may have a Young's modulus greater than 18000 MPa. In some embodiments, the minimum frequency at which the high-order mode occur to the case panel may be not less than 4000 Hz. Preferably, the minimum frequency at which the high-order mode occurs to the case panel may be not less than 6000 Hz. More preferably, the minimum frequency at which the high-order mode occurs to the case panel may be not less than 8000 Hz. More preferably, the minimum frequency at which the high-order mode occurs to the case panel may be not less than 10000 Hz. More preferably, the minimum frequency at which the high-order mode occurs to the case panel may be not less than 15000 Hz. More preferably, the minimum frequency at which the high-order mode occurs to the case panel may be not less than 20000 Hz.

In some embodiments, the frequency of the peak in the frequency response curve of the case panel may be greater than 1000 Hz by adjusting the stiffness of the case panel. Preferably, the frequency of the peak may be greater than 2000 Hz. Preferably, the frequency of the peak may be greater than 4000 Hz. Preferably, the frequency of the peak may be greater than 6000 Hz. More preferably, the frequency of the peak may be greater than 8000 Hz. More preferably, the frequency of the peak may be greater than 10000 Hz. More preferably, the frequency of the peak may be greater than 12000 Hz. Further preferably, the frequency of the peak may be greater than 14000 Hz. Further preferably, the frequency of the peak may be greater than 16000 Hz. Further preferably, the frequency of the peak may be greater than 18000 Hz. Further preferably, the frequency of the peak may be greater than 20000 Hz.

In some embodiments, the case panel may be composed of one material. In some embodiments, the case panel may be generated by stacking two or more materials. In some embodiments, the case panel may be composed of a layer of a material with a larger Young's modulus and a layer of a material with a smaller Young's modulus, which may satisfy a stiffness requirement of the case panel, improve the comfort of contact with the human body, and improve the fit between the case panel and the human body. In some embodiments, the material with a larger Young's modulus may be acrylonitrile butadiene styrene (ary), PS, and HIPS, PP, PET, PES, PC, PA, PVC, PU, polyvinylidene chloride, PE, PMMA, PEEK, PF, UF, MF, metal, alloy (e.g., aluminum alloy, chromium molybdenum steel, scandium alloy, magnesium alloy, titanium alloy, magnesium-lithium alloy, nickel alloy), glass fiber, carbon fiber, or the like, or any combination thereof. In some embodiments, the material of the case panel 710 any combination of materials such as the glass fiber and/or the carbon fiber with the PC and/or the PA. In some embodiments, the material of the case panel 710 may be made by mixing the carbon fiber and the PC according to a certain ratio. In some embodiments, the material of the case panel 710 may be made by mixing the carbon fiber, the glass fiber, and the PC according to a certain ratio. In some embodiments, the material of the case panel 710 may be made by mixing the glass fiber and the PC according to a certain ratio. By adding different proportions of the carbon fiber or the glass fiber, the stiffness of the resulting material may be different. For example, by adding 20% to 50% of glass fiber, the Young's modulus of the material may reach 4000 MPa to 8000 MPa. In some embodiments, the material with a smaller Young's modulus may be silica gel.

Figure 13:
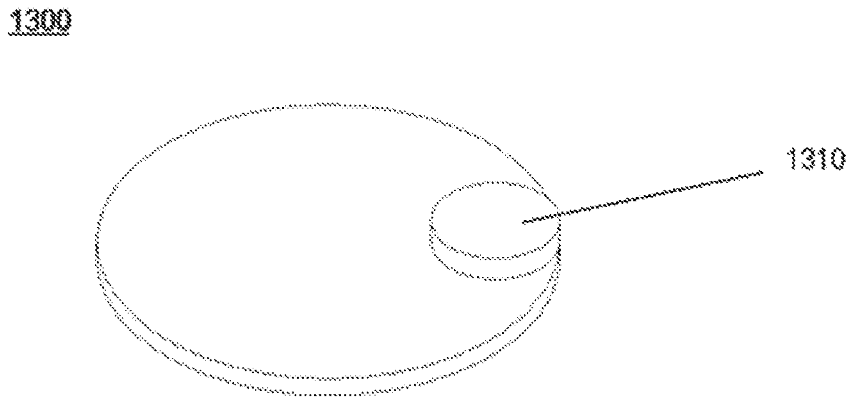
FIG. 13 is a schematic structural diagram illustrating the case panel according to some embodiments of the present disclosure.

In some embodiments, an outer surface of the case panel that contacts the human body may be a flat surface. In some embodiments, the outer surface of the case panel may have some protrusions or pits. FIG. 13 is a schematic structural diagram illustrating the case panel according to some embodiments of the present disclosure. As shown in FIG. 13, an upper surface of the case panel 1300 may have a protrusion 1310. In some embodiments, the outer surface of the case panel may be a curved surface of any contour.

Figure 14A:
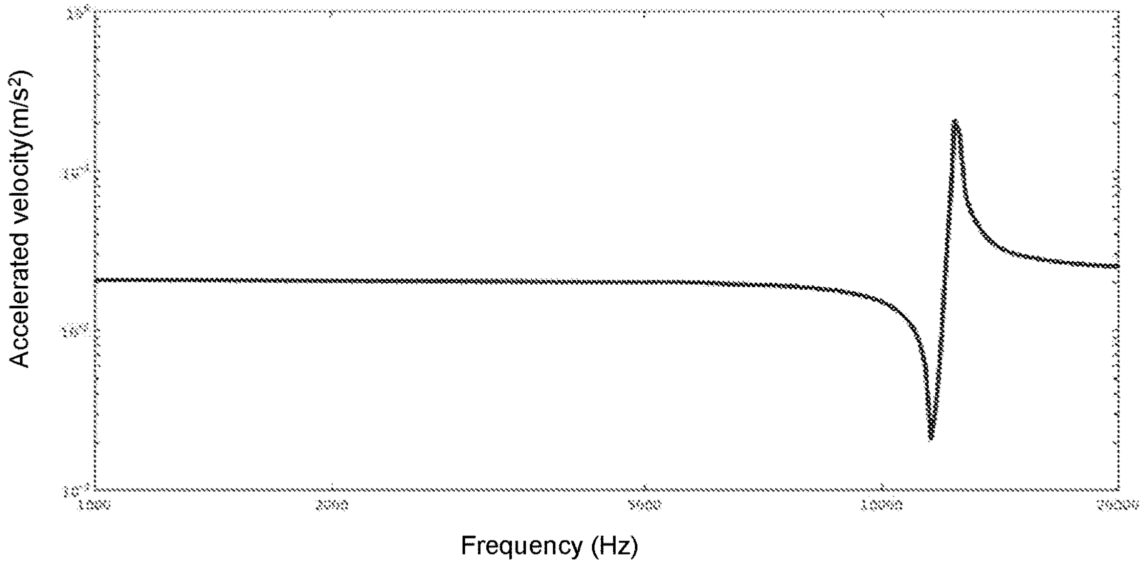
FIG. 14A is a diagram illustrating a frequency response curve generated by the case back of the bone conduction earphone.

FIG. 14A is a diagram illustrating a frequency response curve generated by the case back of the bone conduction speaker. At low and middle frequencies, the vibration of the case back of the case may be consistent with the vibration of the case panel. At a high frequency, the high-order mode may occur to the case back. The high-order mode of the case back may affect the movement speed and direction of the case panel through the case side. At the high frequency, the deformation of the case back and the deformation of the case panel may reinforce or cancel out each other, generating peaks and valleys. In some embodiments, the frequency of the peak may be higher by adjusting the material and a geometric dimension of the case back, thereby obtaining a wider range of a flatter frequency response curve. In this way, the sound quality of bone conduction earphone may be improved, and the human ear's sensitivity to high-frequency sound leakage may be reduced, thereby reducing the sound leakage of the bone conduction speaker. In some embodiments, the frequency of the peak of the case back may be adjusted by adjusting the Young's modulus, the weight, and/or the size of the material of the case back. In some embodiments, the material of the case back may have a Young's modulus greater than 2000 Mpa. Preferably, the material of the case back may have a Young's modulus greater than 4000 Mpa. Preferably, the material of the case back may have a Young's modulus greater than 6000 Mpa. Preferably, the material of the case back may have a Young's modulus greater than 8000 Mpa. Preferably, the material of the case back may have a Young's modulus greater than 12000 Mpa. More preferably, the material of the case back may have a Young's modulus greater than 15000 Mpa. Further preferably, the material of the case back may have a Young's modulus greater than 18000 Mpa.

In some embodiments, the frequency of the peak of the case back may be greater than 1000 Hz by adjusting the stiffness of the case back. Preferably, the frequency of the peak may be greater than 2000 Hz. Preferably, the frequency of the peak of the case back may be greater than 4000 Hz. Preferably, the frequency of the peak of the case back may be greater than 6000 Hz. More preferably, the frequency of the peak of the case back may be greater than 8000 Hz. More preferably, the frequency of the peak of the case back may be greater than 10000 Hz. More preferably, the frequency of the peak of the case back may be greater than 12000 Hz. Further preferably, the frequency of the peak of the case back may be greater than 14000 Hz. Further preferably, the frequency of the peak of the case back may be greater than 16000 Hz. Further preferably, the frequency of the peak of the case back may be greater than 18000 Hz. Further preferably, the frequency of the peak of the case back may be greater than 20000 Hz.

In some embodiments, the case back may be composed of one material. In some embodiments, the case back may be generated by stacking two or more materials.

Figure 14B:
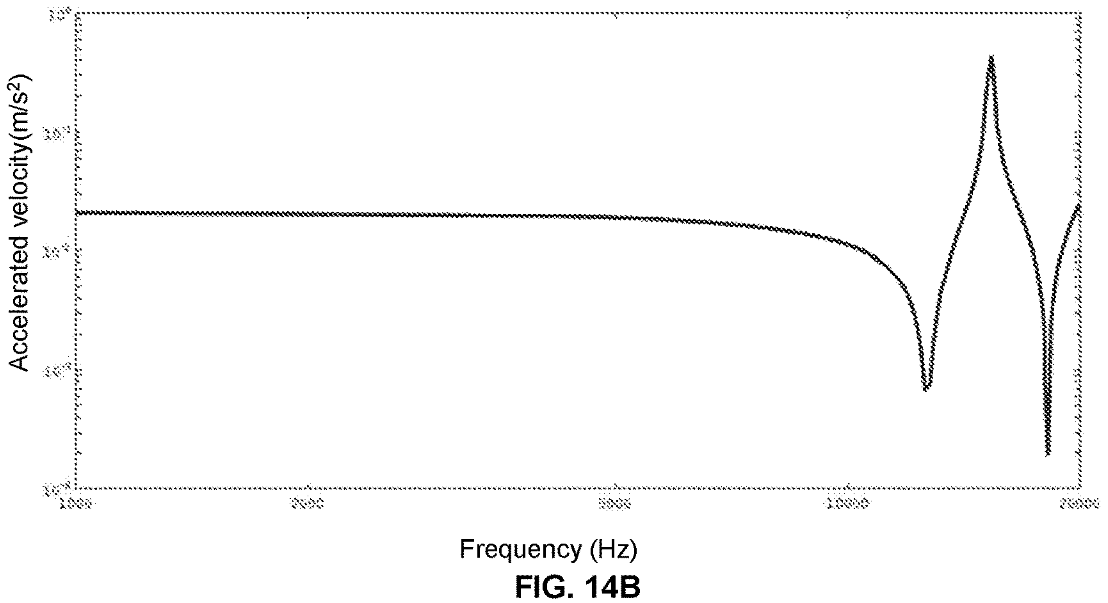
FIG. 14B is a diagram illustrating a frequency response curve generated by the case side of the bone conduction earphone.

FIG. 14B is a frequency response curve generated by the case side of the bone conduction earphone. As mentioned above, the case side itself may not cause sound leakage when vibrating at a low frequency. However, when vibrating at a high frequency, the case side may also affect the sound leakage of the speaker. The reason is that when the frequency is higher, the case side may be deformed, which may cause inconsistent movement of the case panel and the case back, so that the sound leakage of the case panel may not cancel out the sound leakage of the case back, increasing the overall sound leakage. Moreover, the deformation of the case side may also change the bone conduction sound quality. As shown in FIG. 14B, the frequency response curve of the case side may have peaks/valleys at the high frequency. In some embodiments, the frequency of the peak may be higher by adjusting the material and a geometric dimension of the case side, thereby obtaining a wider range of a flatter frequency response curve. In this way, the sound quality of bone conduction earphone may be improved, and the human ear's sensitivity to high-frequency sound leakage may be reduced, thereby reducing the sound leakage of the bone conduction speaker. In some embodiments, the frequency of the peak/valley of the case side may be adjusted by adjusting the Young's modulus, the weight, and/or the size of the material of the case side. In some embodiments, the material of the case side may have a Young's modulus greater than 2000 Mpa. Preferably, the material of the case side may have a Young's modulus greater than 4000 Mpa. Preferably, the material of the case side may have a Young's modulus greater than 6000 Mpa. Preferably, the material of the case side may have a Young's modulus greater than 8000 Mpa. Preferably, the material of the case side may have a Young's modulus greater than 12000 Mpa. More preferably, the material of the case side may have a Young's modulus greater than 15000 Mpa. Further preferably, the material of the case side may have a Young's modulus greater than 18000 Mpa.

In some embodiments, the frequency of the peak of the case side may be greater than 2000 Hz by adjusting the stiffness of the case side. Preferably, the frequency of the peak of the case side may be greater than 4000 Hz. Preferably, the frequency of the peak of the case side may be greater than 6000 Hz. Preferably, the frequency of the peak of the case side may be greater than 8000 Hz. More preferably, the frequency of the peak of the case side may be greater than 10000 Hz. More preferably, the frequency of the peak of the case side may be greater than 12000 Hz. Further preferably, the frequency of the peak of the case side may be greater than 14000 Hz. Further preferably, the frequency of the peak of the case side may be greater than 16000 Hz. Further preferably, the frequency of the peak of the case side may be greater than 18000 Hz. Further preferably, the frequency of the peak of the case side may be greater than 20000 Hz.

In some embodiments, the case side may be composed of one material. In some embodiments, the case side may be generated by stacking two or more materials.

Figure 15:
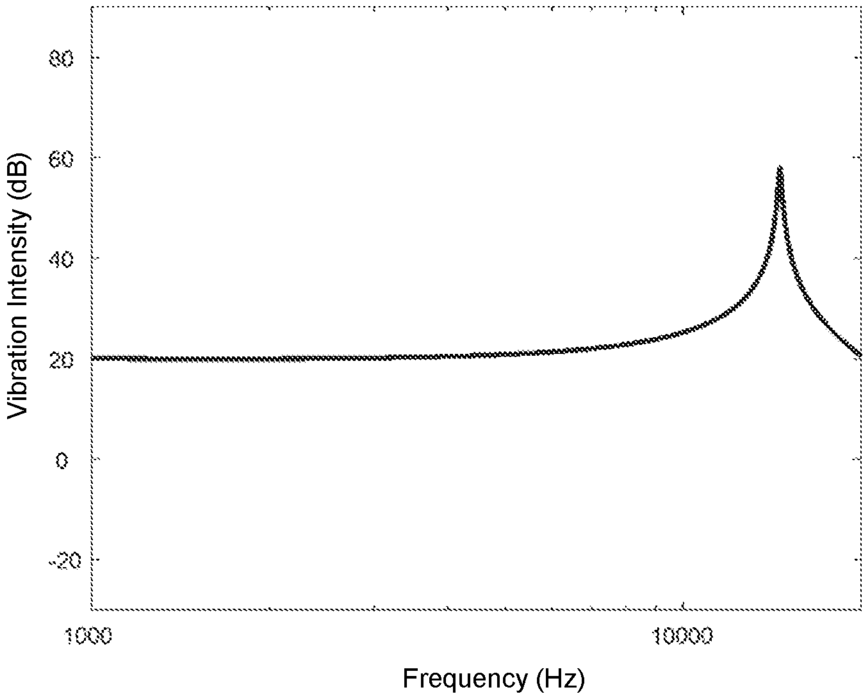
FIG. 15 is a diagram illustrating the frequency response curve of the bone conduction earphone generated by a case bracket of the bone conduction earphone.

The stiffness of the case bracket may also affect the frequency response of the earphone at a high frequency. FIG. 15 is a diagram illustrating the frequency response curve of the bone conduction earphone generated by a case bracket of the bone conduction earphone. As shown in FIG. 15, at the high frequency, the case bracket may produce a resonance peak on the frequency response curve. The resonance peak (s) of case brackets with different stiffnesses at the high frequency may have different positions. In some embodiments, the frequency of the resonance peak may be higher by adjusting the material and geometry of the case bracket, so that the bone conduction speaker may obtain a wider range of a flatter frequency response curve at low and middle frequencies, thereby improving the sound quality of the bone conductive speaker. In some embodiments, the frequency of the resonance peak may be adjusted by adjusting the Young's modulus, the weight, and/or the size of the material of the case bracket. In some embodiments, the material of the case bracket may have a Young's modulus greater than 2000 MPa. Preferably, the material of the case bracket may have a Young's modulus greater than 4000 MPa. Preferably, the material of the case bracket may have a Young's modulus greater than 6000 MPa. Preferably, the material of the case bracket may have a Young's modulus greater than 8000 MPa. Preferably, the material of the case bracket may have a Young's modulus greater than 12000 MPa. More preferably, the material of the case bracket may have a Young's modulus greater than 15000 MPa. Further preferably, the material of the case bracket may have a Young's modulus greater than 18000 MPa.

In some embodiments, the frequency of the peak of the case bracket may be greater than 2000 Hz by adjusting the stiffness of the case bracket. Preferably, the frequency of the peak of the case bracket may be greater than 4000 Hz. Preferably, the frequency of the peak of the case bracket may be greater than 6000 Hz. Preferably, the frequency of the peak of the case bracket may be greater than 8000 Hz. More preferably, the frequency of the peak of the case bracket may be greater than 10000 Hz. More preferably, the frequency of the peak of the case bracket may be greater than 12000 Hz. Further preferably, the frequency of the peak of the case bracket may be greater than 14000 Hz. Further preferably, the frequency of the peak of the case bracket may be greater than 16000 Hz. Further preferably, the frequency of the peak of the case bracket may be greater than 18000 Hz. Further preferably, the frequency of the peak of the case bracket may be greater than 20000 Hz.

In the present disclosure, the stiffness of the case may be increased by adjusting the Young's modulus and the size of the material of the case to ensure the consistency of the case vibration, so that the sound leakage may be superimposed on each other for reduction. The peak corresponding to different parts of the case may be adjusted to a higher frequency, which can improve the sound quality and reduce the sound leakage.

Figure 16A:
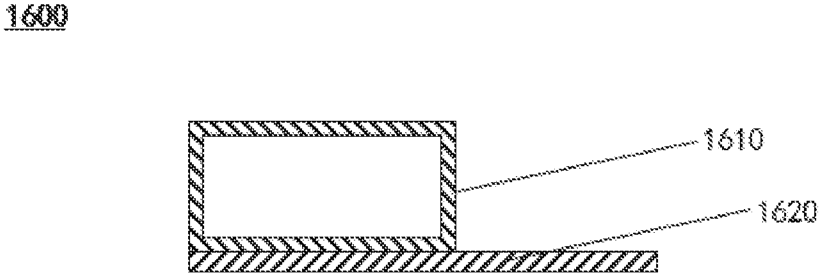
FIG. 16A is a schematic diagram illustrating the bone conduction earphone with an earphone fixing component according to some embodiments of the present disclosure.

FIG. 16A is a schematic diagram illustrating the bone conduction earphone 1600 with an earphone fixing component according to some embodiments of the present disclosure. As shown in FIG. 16A, the earphone fixing component 1620 may be connected to the case 1610. The earphone fixing component 1620 may maintain a stable contact between the bone conduction earphone and human tissues or bones to avoid shaking of the bone conduction earphone, thereby ensuring that the earphone may transmit sound stably. As mentioned above, the earphone fixing component 1620 may be equivalent to an elastic structure. When the stiffness of the earphone fixing component 1620 is smaller (that is, the earphone fixing component 1620 has a smaller stiffness coefficient), the more obvious the resonance peak response at the low frequency is, the more beneficial it is to improve the sound quality of the bone conduction earphone. In addition, the smaller stiffness of the earphone fixing component 1620 may be beneficial to the vibration of the case.

Figure 16B:
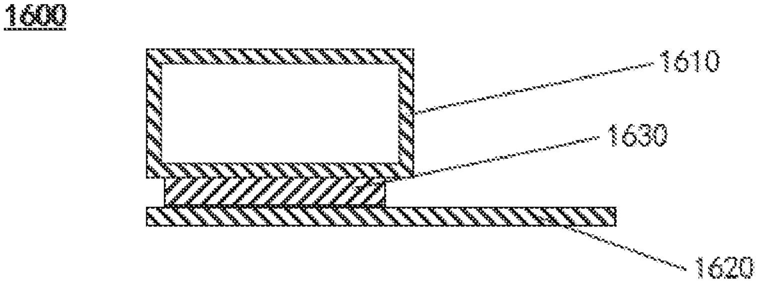
FIG. 16B is another schematic diagram illustrating the bone conduction earphone with the earphone fixing component according to some embodiments of the present disclosure.

FIG. 16B is another schematic diagram illustrating the bone conduction earphone with the earphone fixing component according to some embodiments of the present disclosure. FIG. 16B shows a connection between the earphone fixing component 1620 and the case 1610 of the bone conduction speaker 1600 through a connecting member 1630. In some embodiments, the connection member 1630 may be silicone, sponge, shrapnel, or the like, or any combination thereof.

In some embodiments, the earphone fixing component 1620 may be in the form of an ear hook. Both ends of the earphone fixing component 1620 may be connected to one case 1610, respectively. The two case(s) 1610 may be fixed to two sides of a skull in the form of an ear hook. In some embodiments, the earphone fixing component 1620 may be a mono-aural ear clip. The earphone fixing component 1620 may be connected to one case 1610, and fix the case 1610 on one side of the skull.

It should be understood that the above methods for connecting the earphone fixing component to the case are merely some examples or embodiments of the present disclosure. Those skilled in the art may make a proper adjustment to the connection between the earphone fixing component and the case according to various application scenarios in the present disclosure. More description regarding the connection between the earphone fixing component and the case may be found elsewhere in the present disclosure. See, e.g., FIGS. 23A-23C and relevant descriptions thereof.

Embodiment 1

Figure 17:
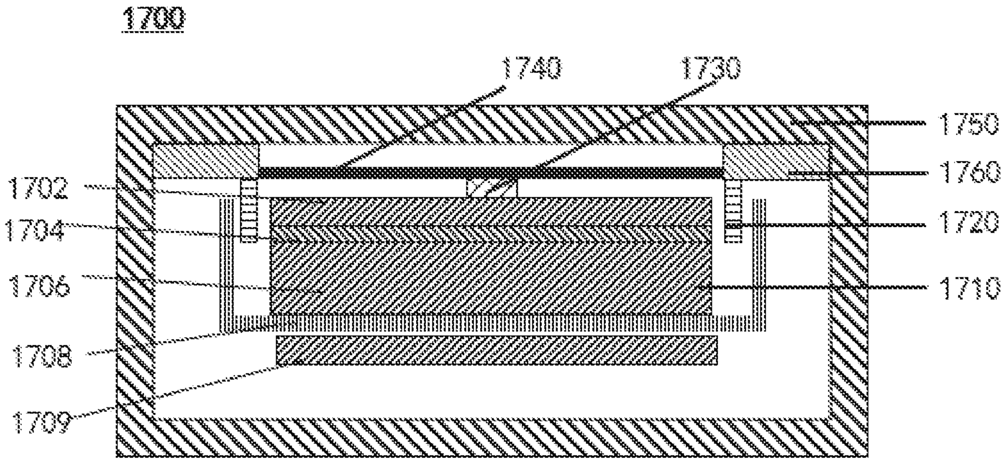
FIG. 17 is a longitudinal cross-sectional view illustrating the case of the bone conduction earphone according to some embodiments of the present disclosure.

FIG. 17 is a longitudinal cross-sectional view illustrating the case of a bone conduction earphone 1700 according to some embodiments of the present disclosure. As shown in FIG. 17, the bone conduction speaker 1700 may include a magnetic circuit component 1710, a coil 1720, a connector 1730, a vibration transmission sheet 1740, a case 1750, and a case bracket 1760. In some embodiments, the bone conduction speaker 1700 may further include a first element and a second element. The coil 1720 may be connected to the case 1750 through the first element. The magnetic circuit component 1710 may be connected to the case 1750 through the second element, and the elastic modulus of the first element is greater than the elastic modulus of the second element, so as to realize a hard connection between the coil 1720 and the case 1750, and a hard connection between the magnetic circuit component 1710 and the case 1750. In this way, positions of the low-frequency resonance peak and the high-frequency resonance peak may be adjusted, and the frequency response curve may be optimized. In some embodiments, the first element may be a case bracket 1760, which is fixedly connected inside the case 1750, and connected to the coil 1720. The case bracket 1760 may be an annular bracket fixed on an inner side wall of the case 1750. The case bracket 1760 may be a rigid member. The shell bracket 1760 may be made of a material with a Young's modulus greater than 2000 Mpa. In some embodiments, the second element may be the vibration transmission sheet 1740. The magnetic circuit component 1710 may be connected to the vibration transmission sheet 1740. The vibration transmission piece may be an elastic member. The case 1750 may be mechanically vibrated by the vibration transmission sheet 1740, and transmit the vibration to a tissue and a bone. The mechanical vibration may be transmitted to an auditory nerve via the tissue and the bone, so that the human body may hear the sound. An overall stiffness of the case 1750 may be large, so that when the bone conduction earphone 1700 is working, the entire case 1750 may vibrate together, that is, the case panel, the case side, and the case back on the case 1750 may maintain substantially the same vibration amplitude and phase. The sound leakage outside the case 1750 may be superimposed and canceled each other, which significantly reduces the external sound leakage.

The magnetic circuit component 1710 may include a first magnetic element 1706, a first magnetically conductive element 1704, a second magnetic element 1702, and a second magnetically conductive element 1708. A lower surface of the first magnetically conductive element 1704 may be connected to an upper surface of the first magnetic element 1706. An upper surface of the second magnetically conductive element 1708 may be connected to a lower surface of the first magnetic element 1706. A lower surface of the second magnetic element 1708 may be connected to an upper surface of the first magnetically conductive element 1704. The magnetization directions of the first magnetic element 1706 and the second magnetic element 1708 may be opposite. The second magnetic element 1708 may suppress a magnetic flux leakage on a side of the upper surface of the first magnetic element 1706, so that more of a magnetic field generated by the first magnetic element 1706 may be compressed in a magnetic gap between the second magnetically conductive element 1708 and the first magnetic element, which may improve the magnetic induction intensity in the magnetic gap, thereby improving the sensitivity of the bone conduction earphone 1700.

Similarly, a third magnetic element 1709 may also be added to the lower surface of the second magnetically conductive element 1708. The magnetization directions of the third magnetic element 1709 and the first magnetic element 1706 may be opposite, so to suppress a magnetic flux leakage on a side of the lower surface of the first magnetic element 1706, which may compress the magnetic field generated by the first magnetic element 1706 into the magnetic gap, thereby improving the magnetic induction intensity in the magnetic gap and the sensitivity of the bone conduction speaker 1700.

The first magnetic element 1706, the first magnetically conductive element 1704, the second magnetically conductive 1702, the second magnetically conductive element 1708, and the third magnetically conductive element 1709 may be fixed by glue. The first magnetic element 1706, the first magnetically conductive element 1704, the second magnetic element 1702, the second magnetically conductive element 1708, and the third magnetically conductive element 1709 may be drilled and fixed by screws.

Embodiment 2

Figure 18A:
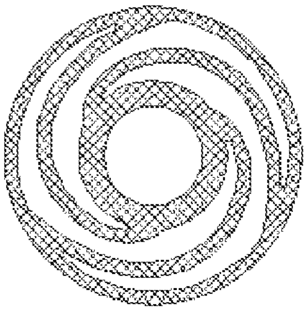
FIG. 18A is a schematic diagram illustrating the vibration transmission sheet of the bone conduction earphone according to some embodiments of the present disclosure.

FIG. 18A is a schematic diagram illustrating the vibration transmission sheet of the bone conduction earphone according to some embodiments of the present disclosure. As shown in FIG. 18A, the vibration transmission sheet may include an outer ring and an inner ring, and several connecting rods provided between the outer ring and the inner ring. The outer ring and the inner ring may be concentric circles. The connecting rod may have an arc shape with a certain length. A count of the connecting rods may be three or more. The inner ring of the vibration transmission sheet can be fixedly connected with a connecting piece.

Figure 18B:
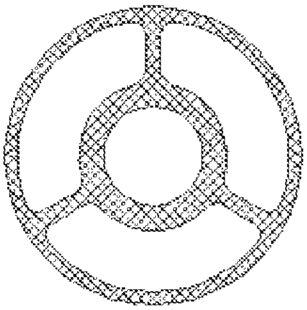
FIG. 18B is another schematic diagram illustrating the vibration transmission sheet of the bone conduction earphone according to some embodiments of the present disclosure.

FIG. 18B is another schematic diagram illustrating the vibration transmission sheet of the bone conduction earphone according to some embodiments of the present disclosure. As shown in FIG. 18B, the vibration transmission sheet may include an outer ring and an inner ring, and several connecting rods provided between the outer ring and the inner ring. The connecting rod may be a straight rod. A count of the connecting rods may be three or more.

Figure 18C:
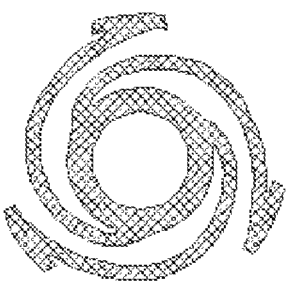
FIG. 18C is another schematic diagram illustrating the vibration transmission sheet of the bone conduction earphone according to some embodiments of the present disclosure.

FIG. 18C is another schematic diagram illustrating the vibration transmission sheet of the bone conduction earphone according to some embodiments of the present disclosure. As shown in FIG. 18C, the vibration transmission sheet may include an inner ring, and a plurality of curved rods that surround the inner ring and radiate outward. A count of the curved rods may be three or more.

Figure 18D:
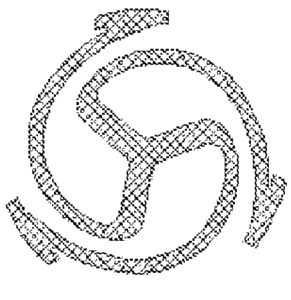
FIG. 18D is another schematic diagram illustrating the vibration transmission sheet of the bone conduction earphone according to some embodiments of the present disclosure.

FIG. 18D is another schematic diagram illustrating the vibration transmission sheet of the bone conduction earphone according to some embodiments of the present disclosure. As shown in FIG. 18D, the vibration transmission sheet may be composed of several curved rods. One end of each of the curved rods may be concentrated at a center point of the vibration transmission sheet, and the other end of each of the curved rods may surround the center point of the vibration transmission sheet. A count of the curved rods may be three or more.

Embodiment 3

Figure 19:
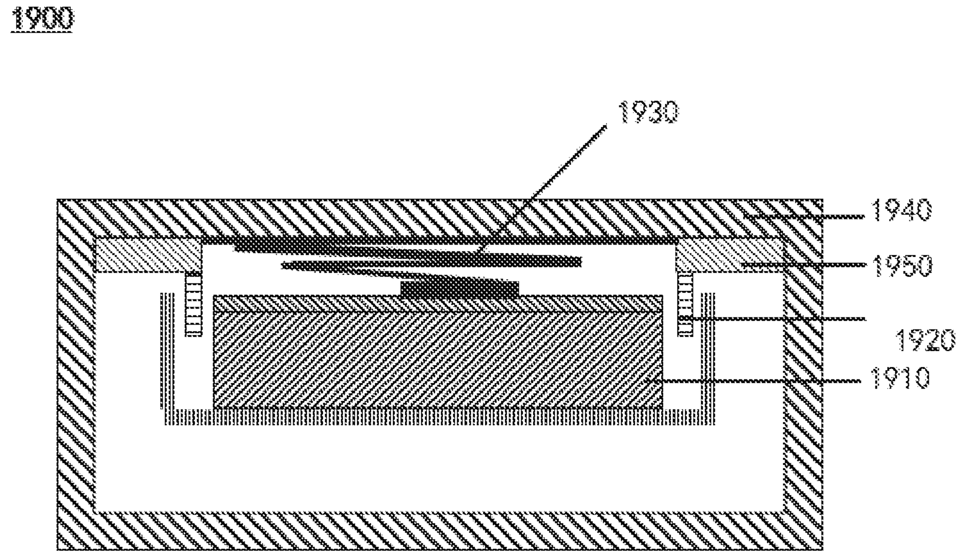
FIG. 19 is a longitudinal cross-sectional view illustrating the bone conduction earphone with a three-dimensional vibration transmission sheet according to some embodiments of the present disclosure.

FIG. 19 is a longitudinal cross-sectional view illustrating the bone conduction earphone with a three-dimensional vibration transmission sheet according to some embodiments of the present disclosure. The bone conduction speaker 1900 may include a magnetic circuit component 1910, a coil 1920, a vibration transmission sheet 1930, a case 1940, and a case bracket 1950. Compared to Embodiment 1, the vibration transmission sheet in FIG. 17 is a planar structure, and the vibration transmission sheet is on a plane. The vibration transmission sheet in embodiment 3 may have a three-dimensional structure. As shown in FIG. 19, the vibration transmission sheet 1930 has a three-dimensional structure in a thickness direction in a natural state without stress. The three-dimensional vibration transmission sheet may reduce a size of the bone conduction earphone 1900 in the thickness direction. Referring to FIG. 17, wherein the vibration transmission sheet is a planar structure, in order to ensure that the vibration transmission sheet may vibrate in a vertical direction during operation, a certain space may need to be reserved above and below the vibration transmission sheet. If the vibration transmission sheet itself has a thickness of 0.2 mm, a size of 1 mm may need to be reserved above the vibration transmission sheet, and a size of 1 mm may need to be reserved below the vibration transmission sheet. Then, a size of at least 2.2 mm may be required between the lower surface of the case panel 1940 to the upper surface of the magnetic circuit component. The three-dimensional vibration transmission sheet may vibrate in its own thickness space. A size of the three-dimensional vibration transmission sheet in the thickness direction may be 1.5 mm. At this time, the size between the lower surface of the case panel 1940 and the upper surface of the magnetic circuit component 1910 may only need 1.5 mm, saving a size of 0.7 mm. In this way, the size of the bone conduction speaker 1900 in the thickness direction may be greatly reduced, and the connecting piece may be eliminated, simplifying an internal structure of the bone conduction speaker 1900. In addition, comparing the three-dimensional vibration transmission sheet with the planar vibration transmission sheet having the same size, the three-dimensional vibration transmission sheet may have a greater vibration amplitude than the planar vibration transmission sheet, which increases a maximum volume that bone conduction speaker 1900 may provide.

The projection area of the three-dimensional projection 1930 may be any shape mentioned in Embodiment 2.

In some embodiments, an outer edge of the three-dimensional projection 1930 may be connected to an inner side of the case bracket 1950. For example, when the three-dimensional vibration transmission sheet 1930 adopts a configuration of the vibration transmission sheet shown in FIG. 18A or 18B, the outer edge (an outer ring) may be connected to the inner side of the case bracket 1950 by gluing, clamping, welding, or screwing. When the three-dimensional vibration transmission sheet 1930 adopts a configuration of the vibration transmission sheet shown in FIG. 18C or 18D, the outer edge (a curved rod surrounding an inner ring) may be connected to the inner side of the case bracket 1950 by gluing, clamping, welding, or screwing. In some embodiments, the case bracket 1950 may be provided with several slots, and the outer edge of the three-dimensional vibration transmission sheet 1930 may be connected to the outer side of the case bracket 1950 through the slots. Moreover, a length of the vibration transmission sheet 1930 may be increased, which helps the resonance peak to move to the low frequency direction, thereby improving the sound quality. A size of the slot may provide sufficient space for the vibration of the vibration transmission sheet 1930.

Embodiment 4

Figure 20A:
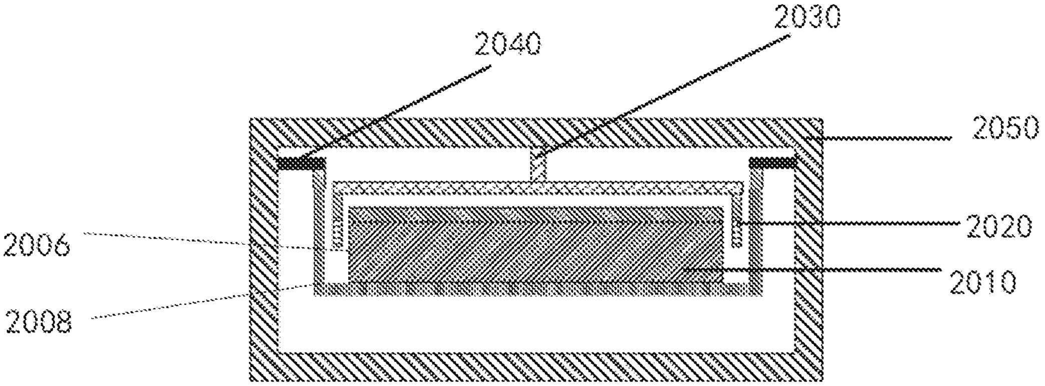
FIG. 20A is a longitudinal cross-sectional view illustrating the bone conduction earphone according to some embodiments of the present disclosure.

FIG. 20A is a longitudinal cross-sectional view illustrating the bone conduction earphone according to some embodiments of the present disclosure. As shown in FIG. 20A, unlike the structure in Embodiment 1, there is no case bracket in the bone conduction speaker. The first element is a connecting member 2030, and the coil 2020 is connected to the case 2050 through the connecting member 2030. The connecting member 2030 may include a cylindrical body. One end of the cylindrical body may be connected to the case 2050, and the other end of the cylindrical body may be provided with a circular end having a large cross-sectional area. The circular end may be fixedly connected to the coil 2020. The connecting member 2030 may be a rigid member. The connector may be made of a material with a Young's modulus greater than 4000 Mpa. A gasket may be connected between the coil 2020 and the connecting member 2030. The second component is the vibration transmission sheet 2040. The magnetic circuit component 2010 may be connected to the vibration transmission sheet 2040, and the vibration transmission sheet 2040 may be directly connected to the case 2050. The vibration transmission sheet 2040 may be an elastic member. The vibration transmission sheet 2040 may be located above the magnetic circuit component 2010. The vibration transmission sheet 2040 may be connected to the upper end surface of the second magnetically conductive element 2008. The vibration transmission sheet 2040 and the second magnetically conductive element 2008 may be connected by a washer.

Figure 20B:
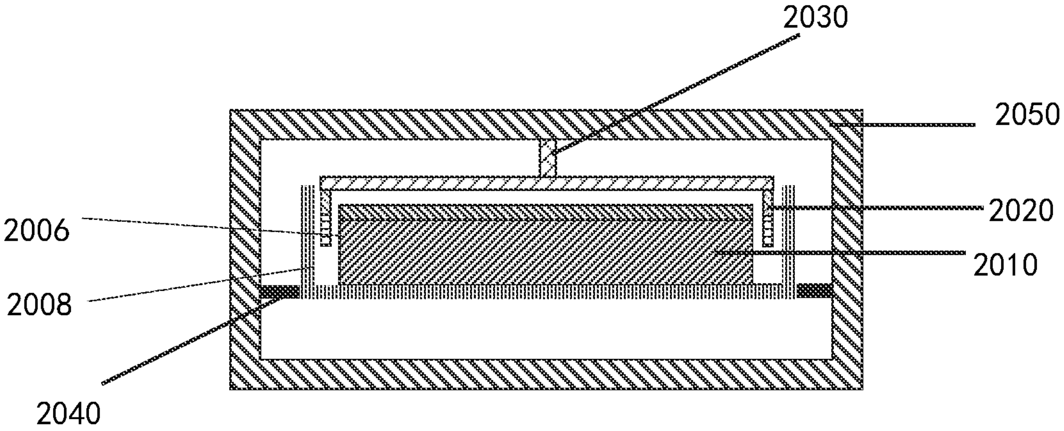
FIG. 20B is another longitudinal cross-sectional view illustrating the bone conduction earphone according to some embodiments of the present disclosure.

FIG. 20B is another longitudinal cross-sectional view illustrating the bone conduction earphone according to some embodiments of the present disclosure. As shown in FIG. 20B, unlike the structure of FIG. 20A, the vibration transmission sheet 2040 may be located between the second magnetically conductive element 2008 and a side wall of the case 2050, and connected to the outside of the second magnetically conductive element 2008.

Figure 20C:
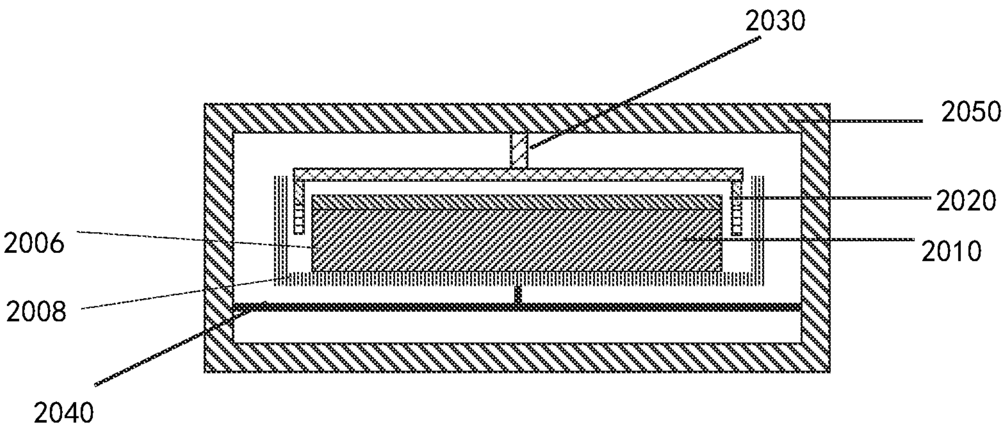
FIG. 20C is another longitudinal cross-sectional view illustrating the bone conduction earphone according some embodiments of the present disclosure.

FIG. 20C is another longitudinal cross-sectional view illustrating the bone conduction earphone according some embodiments of the present disclosure. As shown in FIG. 20C, the vibration transmission sheet 2040 may also be disposed under the magnetic circuit component 2010, and connected to the lower surface of the second magnetically conductive element 2008.

Figure 20D:
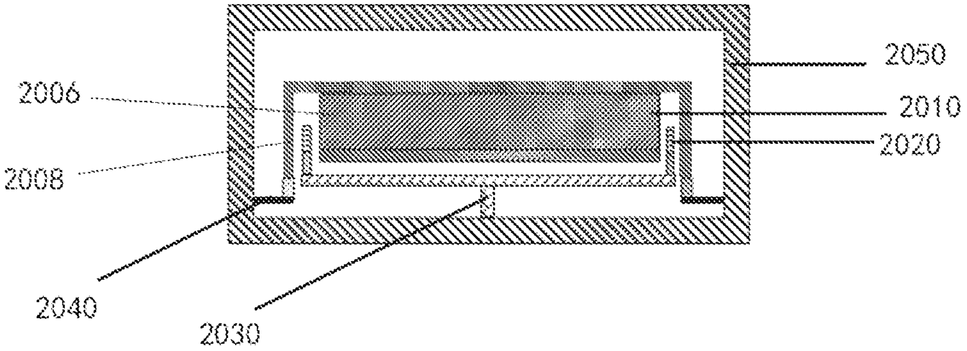
FIG. 20D is another longitudinal cross-sectional view illustrating of the bone conduction earphone according to some embodiments of the present disclosure.

FIG. 20D is another longitudinal cross-sectional view illustrating of the bone conduction earphone according to some embodiments of the present disclosure. As shown in FIG. 20D, the coil 2020 may be fixedly connected to the case back through the connecting member 2030.

Embodiment 5

Figure 21:
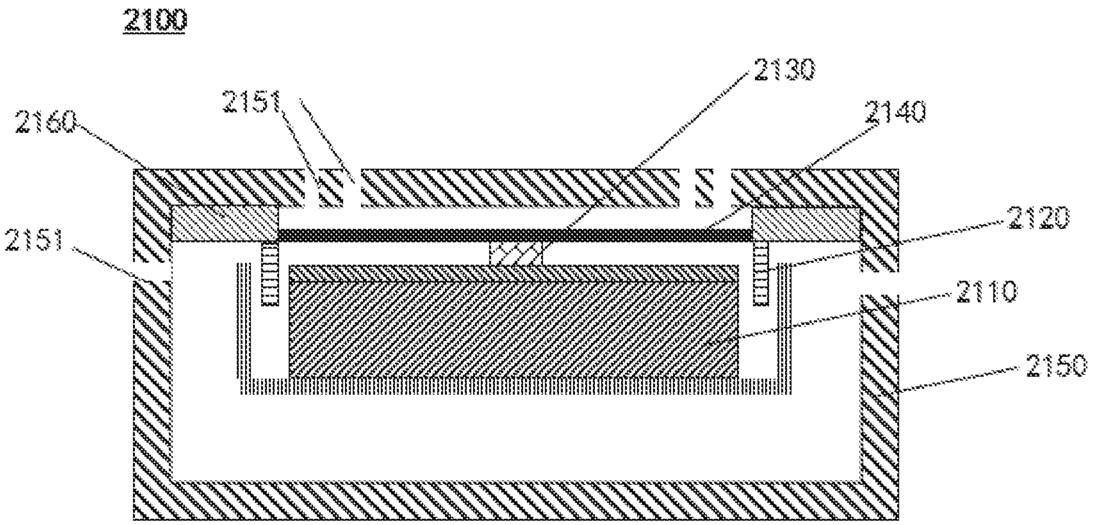
FIG. 21 is a longitudinal cross-sectional view illustrating the bone conduction earphone with a sound-inducing hole shown according to some embodiments of the present disclosure.

FIG. 21 is a longitudinal cross-sectional view illustrating the bone conduction earphone with a sound-inducing hole shown according to some embodiments of the present disclosure. As shown in FIG. 21, the bone conduction earphone 2100 may include a magnetic circuit component 2110, a coil 2120, a connecting member 2130, a vibration transmission sheet 2140, a case 2150, and a case bracket 2160. The case 2150 may be mechanically vibrated under the drive of the vibration transmission sheet 2140, and transmit the mechanical vibration to a tissue and a bone. The mechanical vibration may be transmitted to an auditory nerve via the tissue and the bone, so that the human body may hear the sound. An overall stiffness of the case 2150 may be large, so that when the bone conduction earphone 2100 is working, the entire case 2150 may vibrate together, which may cancel out the sound leakage outside the case 2150 and significantly reduce the external sound leakage. A plurality of sound guiding holes 2151 may be set on the case 2150. The sound guiding holes 2151 may propagate sound leakage inside the earphone 2100 to the outside of the case 2150, so as to make the sound leakage inside the earphone 2100 cancel out sound leakage outside the case 2150, thereby reducing the sound leakage of the earphone 2100. It should be understood that a vibration of a component inside the case 2150 may generate a vibration of internal air, which generates sound leakage. In addition, the vibration of the component inside the case 2150 may be the same as the vibration of the case 2150. In such case, the vibration of the component inside the case 2150 may generate sound leakage in an opposite direction to the sound leakage generated by the vibration of the case 2150. Thus, the sound leakage of the component inside the case 2150 and the case 2150 may cancel out each other, thereby reducing the sound leakage. A position, a size, and a count of sound-guiding holes 2151 may be adjusted to adjust the sound leakage inside the case 2150 that needs to be propagated outside the case 2150, to ensure that the sound leakage inside and outside the case 2150 may be cancelled out by each other, thereby reducing the sound leakage. In some embodiments, a damping layer may be provided at the positions of the sound guiding holes 2151 on the case 2150, to adjust a phase and an amplitude of the sound propagated by the sound guiding holes 2151, thereby improving the sound leakage cancellation effect.

Embodiment 6

In various application scenarios, the case of the bone conduction earphone described in the present disclosure may be made through various assembly methods. For example, as described elsewhere in the present disclosure, the case of the bone conduction earphone may be formed in one piece, in a separate combination, or in a combination thereof. In the separate combination, different separate components may be fixed by gluing, clamping, welding, or screwing. In order to better understand the assembly methods of the case of the bone conduction earphone in the present disclosure, FIGS. 22A-22C show several exemplary assembly methods of the case of the bone conduction earphone.

Figure 22A:
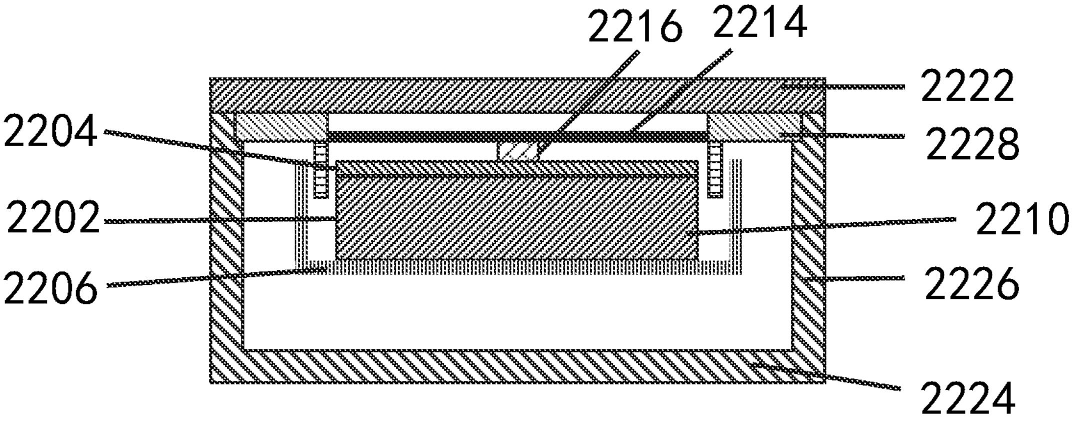
FIG. 22A is a longitudinal cross-sectional view illustrating the bone conduction earphone according to some embodiments of the present disclosure.

FIG. 22A is a longitudinal cross-sectional view illustrating the bone conduction earphone according to some embodiments of the present disclosure. As shown in FIG. 22A, the case of the bone conduction earphone may include a case panel 2222, a case back 2224, and a case side 2226. The case side 2226 and the case back 2224 may be made by an integral molding method, and the case panel 2222 may be connected to one end of the case side 2226 by means of the separate combination. The separate combination may include fixing the case panel 2222 to one end of the case side 2226 by gluing, clamping, welding, or screwing. The case panel 2222 and the case side 2226 (or the case back 2224) may be made of different, the same, or partially different materials. In some embodiments, the case panel 2222 and the case side 2226 may be made of the same material, and the same material may have a Young's modulus greater than 2000 MPa. More preferably, the same material may have a Young's modulus greater than 4000 MPa. More preferably, the same material may have a Young's modulus greater than 6000 MPa. More preferably, the same material may have a Young's modulus greater than 8000 MPa. More preferably, the same material may have a Young's modulus greater than 12000 MPa. More preferably, the same material may have a Young's modulus greater than 15000 MPa. Further preferably, the same material may have a Young's modulus greater than 18000 MPa. In some embodiments, the case panel 2222 and the case side 2226 may be made of different materials, and both of the different materials may have Young's moduli greater than 4000 MPa. More preferably, both of the different materials may have Young's moduli greater than 6000 MPa. More preferably, both of the different materials may have Young's moduli greater than 8000 MPa. More preferably, both of the different materials may have Young's moduli greater than 12000 MPa. More preferably, both of the different materials may have Young's moduli greater than 15000 MPa. Further preferably, both of the different materials may have Young's moduli greater than 18000 MPa. In some embodiments, the materials of the case panel 2222 and/or the case side 2226 may include, but are not limited to ABS, PS, HIPS, PP, PET, PES, PC, PA, PVC, PU, polyvinylidene chloride, PE, PMMA, PEEK, PF, UF, MF, metal, alloy (e.g., aluminum alloy, chromium molybdenum steel, scandium alloy, magnesium alloy, titanium alloy, magnesium-lithium alloy, nickel alloy), glass fiber, carbon fiber, or the like, or any combination thereof. In some embodiments, the material of the case panel 2222 may be any combination of materials such as the glass fiber and/or the carbon fiber with the PC and/or the PA. In some embodiments, the material of the case panel 2222 and/or the case side 2226 may be made by mixing the carbon fiber and the PC according to a certain ratio. In some embodiments, the material of the case panel 2222 and/or the case side 2226 may be made by mixing the carbon fiber, the glass fiber, and the PC according to a certain ratio. In some embodiments, the material of the case panel 2222 and/or the case side 2226 may be made by mixing the glass fiber and the PC according to a certain ratio. In some embodiments, the material of the case panel 2222 and/or the case side 2226 may be made by mixing the glass fiber and the PA according to a certain ratio.

As shown in FIG. 22A, the case panel 2222, the case back 2224, and the case side 2226 form an overall structure with a certain accommodating space. In the overall structure, the vibration transmission piece 2214 may be connected to the magnetic circuit component 2210 through a connecting member 2216. The two sides of the magnetic circuit component 2210 may be connected to the first magnetically conductive element 2204 and the second magnetically conductive element 2206, respectively. The vibration transmission sheet 2214 may be fixed inside the overall structure through a case bracket 2228. In some embodiments, the case side 2226 may have a step structure for supporting the case bracket 2228. After the case bracket 2228 is fixed to the case side 2226, the case panel 2222 may be fixed to both the case bracket 2228 and the case side 2226, or separately fixed to the case bracket 2228 or the case side 2226. In this case, optionally, the case side 2226 and the case bracket 2228 may be integrally formed. In some embodiments, the case bracket 2228 may be directly fixed on the case panel 2222 (for example, by gluing, clamping, welding, or screwing). The fixed case panel 2222 and case bracket 2228 may then be fixed to the case side (for example, by gluing, clamping, welding, or screwing). In this case, optionally, the case bracket 2228 and the case panel 2222 may be integrally formed.

Figure 22B:
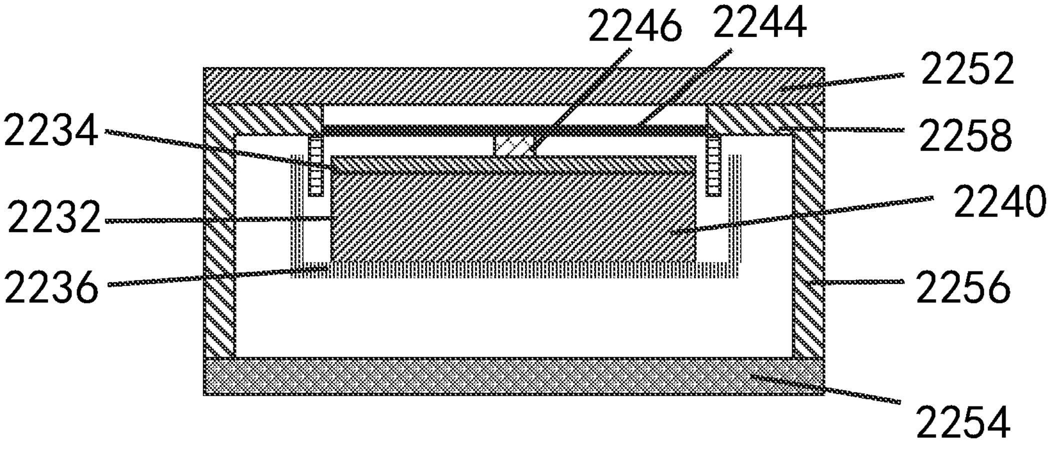
FIG. 22B is another longitudinal cross-sectional view illustrating the bone conduction earphone according to some embodiments of the present disclosure.
Figure 22C:
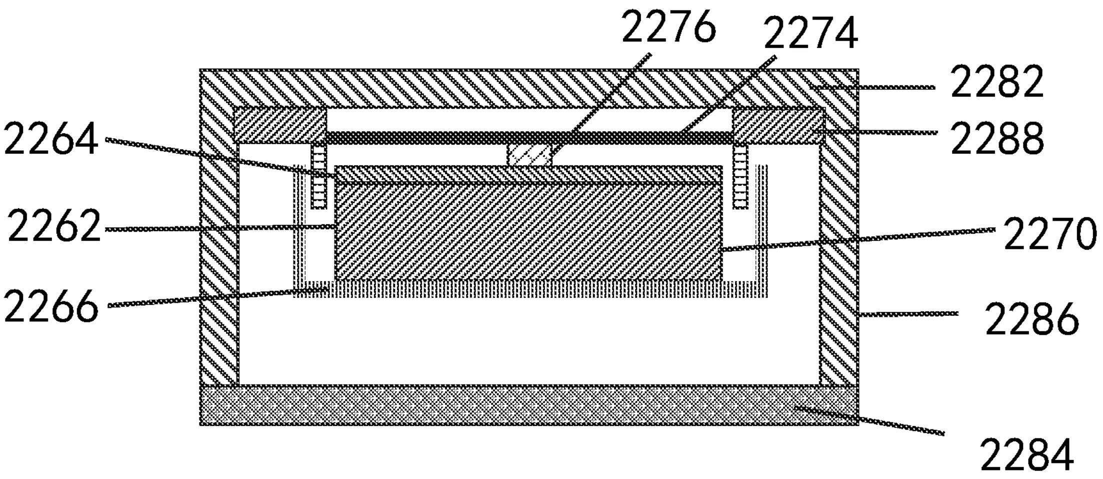
FIG. 22C is another longitudinal cross-sectional view illustrating the bone conduction earphone according to some embodiments of the present disclosure.

FIG. 22B is another longitudinal cross-sectional view illustrating the bone conduction earphone according to some embodiments of the present disclosure. As shown in FIG. 22B, a difference between FIG. 22A and FIG. 22A may be that the case bracket 2258 and the case side 2256 may be integrally formed. The case panel 2252 may be fixed on a side of the case side 2256 (for example, by gluing, clamping, welding, or screwing), which is connected to the case bracket 2258. The case back 2254 may be fixed on the other side of the case side 2256 (for example, by gluing, clamping, welding, or screwing). In this case, optionally, the case bracket 2258 and the case side 2256 may be made using the separate combination. The case panel 2252, the case back 2254, the case bracket 2258, and the case side 2256 may be fixedly connected gluing, clamping, welding, or screwing.

FIG. 22C is another longitudinal cross-sectional view illustrating the bone conduction earphone according to some embodiments of the present disclosure. As shown in FIG. 22C, a difference between FIGS. 22A and 22B and FIG. 22C may be that the case panel 2282 and the case side 2286 may be integrally formed. The case back 2284 may be fixed on a side of the case side 2286 facing the case panel 2282 (for example, by gluing, clamping, welding, or screwing). The case bracket 2288 may be fixed on the case panel 2282 and/or the case side 2286 by gluing, clamping, welding, or screwing. In this case, optionally, the case bracket 2288, the case panel 2282, and the case side 2286 may be an integrally formed structure.

Embodiment 7

As described elsewhere in the present disclosure, the case of the bone conduction earphone may maintain a stable contact between the bone conductive speaker and human tissues or bones through the earphone fixing component. In different application scenarios, the earphone fixing component and the case may be connected in different connection methods. For example, the earphone fixing component and the case may be formed in one piece, in a separate combination, or in a combination thereof. In the separate combination, the earphone fixing component may be fixedly connected to a specific part on the case by gluing, clamping, or welding. The specific part on the case may include a case panel, a case back, and/or a case side. In order to better understand the connection methods between the earphone fixing component and the case, FIGS. 23A-23C show several exemplary connection methods of the case of the bone conduction earphone.

Figure 23A:
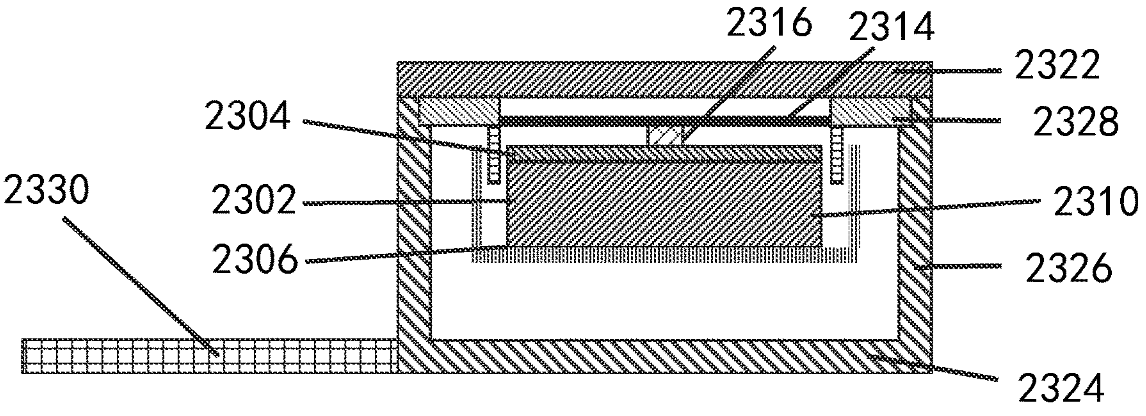
FIG. 23A is a longitudinal cross-sectional view illustrating the bone conduction earphones with the earphone fixing component according to some embodiments of the present disclosure.

FIG. 23A is a longitudinal cross-sectional view illustrating the bone conduction earphones with the earphone fixing component according to some embodiments of the present disclosure. As shown in FIG. 23A, taking an ear hook as an exemplary earphone fixing component, on the basis of FIG. 22A, an ear hook 2330 may be fixedly connected to the case. The ear hook 2330 may be fixed on a case side 2326 or a case back 2324 by gluing, clamping, welding, or screwing. A part of the ear hook 2330 that is connected to the case may be made of a material that is the same as, different from, or partially the same as that of the case side 2326 or the case back 2324. In some embodiments, in order to make the ear hook 2330 have a lower stiffness (i.e., a smaller stiffness coefficient), the material of the ear hook 2330 may include plastic, silicone, and/or metal. For example, the ear hook 2330 may include an arc-shaped titanium wire. Alternatively, the ear hook 2330 may be integrally formed with the case side 2326 or the case back 2324.

Figure 23B:
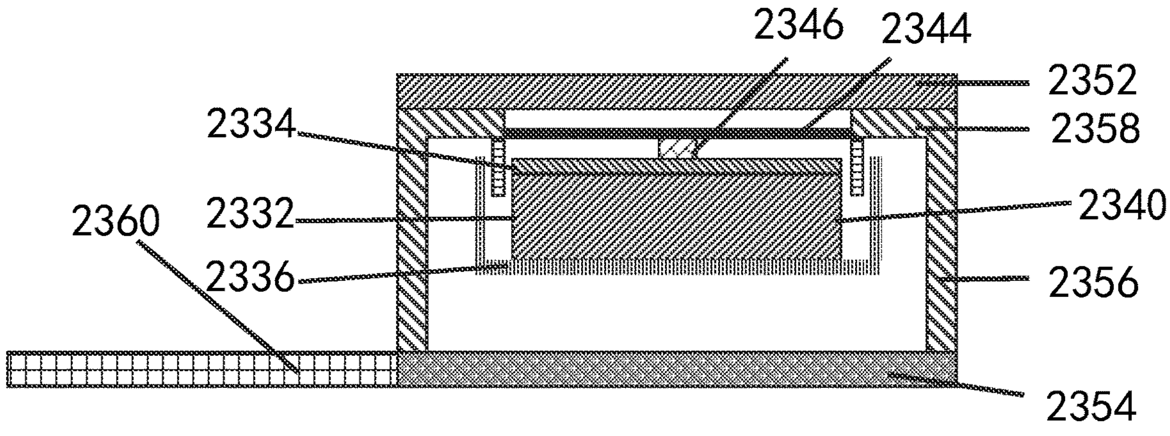
FIG. 23B is another longitudinal cross-sectional view illustrating the bone conduction earphones with the earphone fixing component according to some embodiments of the present disclosure.

FIG. 23B is another longitudinal cross-sectional view illustrating the bone conduction earphones with the earphone fixing component according to some embodiments of the present disclosure. As shown in FIG. 23B, on the basis of FIG. 22B, the ear hook 2360 may be fixedly connected to the case. The ear hook 2360 may be fixed on the case side 2356 or the case back 2354 by gluing, clamping, welding, or screwing. Similar to FIG. 23A, a portion of the ear hook 2360 that is connected to the case may be made of a material that is the same as, different from, or partially the same as that of the case side 2356 or the case back 2354. Optionally, the ear hook 2360 may be integrally formed with the case side 2356 or the case back 2354.

Figure 23C:
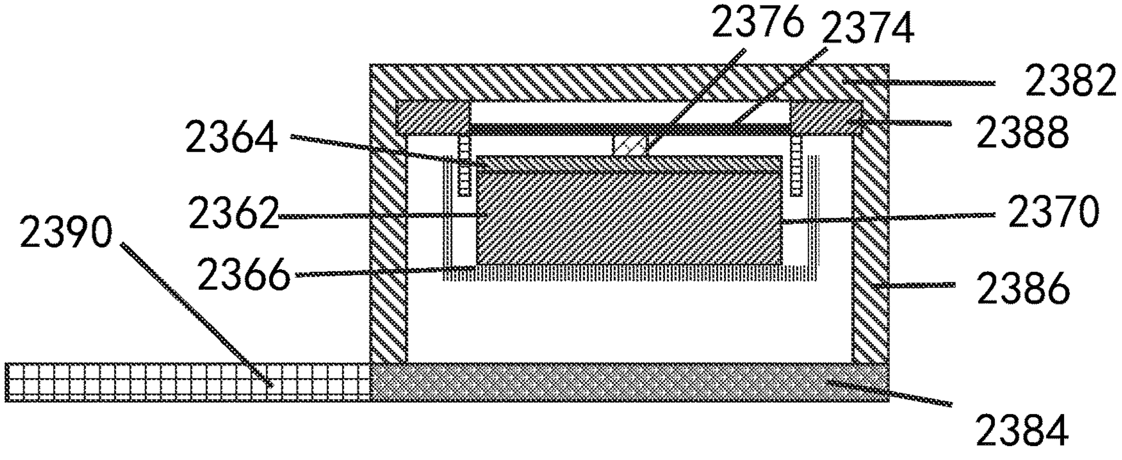
FIG. 23C is another longitudinal cross-sectional view illustrating the bone conduction earphones with the earphone fixing component according to some embodiments of the present disclosure.

FIG. 23C is another longitudinal cross-sectional view illustrating the bone conduction earphones with the earphone fixing component according to some embodiments of the present disclosure. As shown in FIG. 23C, on the basis of FIG. 22C, the ear hook 2390 may be fixedly connected to the case. The ear hook 2390 may be fixed on the case side 2386 or the case back 2384 by gluing, clamping, welding, or screwing. Similar to FIG. 23A, a portion of the ear hook 2390 that is connected to the case may be made of a material that is the same as, different from, or partially the same as that of the case side 2386 or the case back 2384. Optionally, the ear hook 2390 may be integrally formed with the case side 2386 or the case back 2384.

Embodiment 8

As described elsewhere in the present disclosure, the stiffness of the case of the bone conduction earphone may affect the vibration amplitude and phase of different parts of the case (for example, the case panel, the case back, and/or the case side), thereby affecting the sound leakage of the bone conduction earphone. In some embodiments, when the case of the bone conduction earphone has a relatively large stiffness, the case panel and the case back may maintain the same or substantially the same vibration amplitude and phase at a higher frequency, thereby significantly reducing the sound leakage of the bone conduction earphone.

The higher frequency mentioned here may include a frequency not less than 1000 Hz, for example, a frequency between 1000 Hz and 2000 Hz, a frequency between 1100 Hz and 2000 Hz, a frequency between 1300 Hz and 2000 Hz, a frequency between 1500 Hz and 2000 Hz, a frequency between 1700 Hz and 2000 Hz, or a frequency between 1900 Hz and 2000 Hz. Preferably, the higher frequency mentioned here may include a frequency not less than 2000 Hz, for example, a frequency between 2000 Hz and 3000 Hz, a frequency between 2100 Hz and 3000 Hz, a frequency between 2300 Hz and 3000 Hz, a frequency between 2500 Hz and 3000 Hz, a frequency between 2700 Hz and 3000 Hz, or a frequency between 2900 Hz and 3000 Hz. Preferably, the higher frequency mentioned here may include a frequency not less than 4000 Hz, for example, a frequency between 4000 Hz and 5000 Hz, a frequency between 4100 Hz and 5000 Hz, a frequency between 4300 Hz and 5000 Hz, a frequency between 4500 Hz and 5000 Hz, a frequency between 4700 Hz and 5000 Hz, or a frequency between 4900 Hz and 5000 Hz. More preferably, the higher frequency mentioned here may include a frequency not less than 6000 Hz, for example, a frequency between 6000 Hz and 8000 Hz, a frequency between 6100 Hz and 8000 Hz, a frequency between 6300 Hz and 8000 Hz, and a frequency between 6500 Hz and 8000 Hz, a frequency between 7000 Hz and 8000 Hz, a frequency between 7500 Hz and 8000 Hz, or a frequency between 7900 Hz and 8000 Hz. Further preferably, the higher frequency mentioned here may include a frequency not less than 8000 Hz, for example, a frequency between 8000 Hz and 12000 Hz, a frequency between 8100 Hz and 12000 Hz, a frequency between 8300 Hz and 12000 Hz, a frequency between 8500 Hz and 12000 Hz, a frequency between 9000 Hz and 12000 Hz, a frequency between 10000 Hz-12000 Hz, or a frequency between 11000 Hz-12000 Hz.

"The case panel and the case back may maintain the same or substantially the same vibration amplitude" may mean that a ratio of the vibration amplitudes of the case panel and the case back is within a certain range. For example, the ratio of the vibration amplitudes of the case panel and the case back may be between 0.3 and 3. Preferably, the ratio of the vibration amplitudes of the case panel and the case back may be between 0.4 and 2.5. Preferably, the ratio of the vibration amplitudes of the case panel and the case back may be between 0.5 and 1.5. More preferably, the ratio of the vibration amplitudes of the case panel and the case back may be between 0.6 and 1.4. More preferably, the ratio of the vibration amplitudes of the case panel and the case back may be between 0.7 and 1.2. More preferably, the ratio of the vibration amplitudes of the case panel and the case back may be between 0.75 and 1.15. More preferably, the ratio of the vibration amplitudes of the case panel and the case back may be between 0.85 and 1.1. Further preferably, the ratio of the vibration amplitudes of the case panel and the case back may be between 0.9 and 1.05. In some embodiments, the vibration of the case panel and the case back may be represented by other physical quantities that can characterize the amplitudes of the vibration thereof. For example, a sound pressure generated by the case panel and the case back at a point in the space may be used to characterize the vibration amplitudes of the case panel and the case back.

"The case panel and the case back may maintain the same or substantially the same vibration phase" may mean that a ratio of the vibration phases of the case panel and the case back is within a certain range. For example, a difference in vibration phases between the case panel and the case back may be between −90° and 90°. Preferably, the difference in vibration phases between the case panel and the case back may be between −80° and 80°. Preferably, the difference in vibration phases between the case panel and the case back may be between −60° and 60°. Preferably, the difference in vibration phases between the case panel and the case back may be between −45° and 45°. More preferably, the difference in vibration phases between the case panel and the case back may be between −30° and 30°. More preferably, the difference in vibration phases between the case panel and the case back may be between −20° and 20°. More preferably, the difference in vibration phases between the case panel and the case back may be between −15° and 15°. More preferably, the difference in vibration phases between the case panel and the case back may be between −12° and 12°. More preferably, the difference in vibration phases between the case panel and the case back may be between −10° and 10°. More preferably, the difference in vibration phases between the case panel and the case back may be between −8° and 8°. More preferably, the difference in vibration phases between the case panel and the case back may be between −6° and 6°. More preferably, the difference in vibration phases between the case panel and the case back may be between −5° and 5°. More preferably, the difference in vibration phases between the case panel and the case back may be between −4° and 4°. More preferably, the difference in vibration phases between the case panel and the case back may be between −3° and 3°. More preferably, the difference in vibration phases between the case panel and the case back may be between −2° and 2°. More preferably, the difference in vibration phases between the case panel and the case back may be between −1° and 1°. Further preferably, the difference in vibration phases between the case panel and the case back may be 0°.

Figure 24:
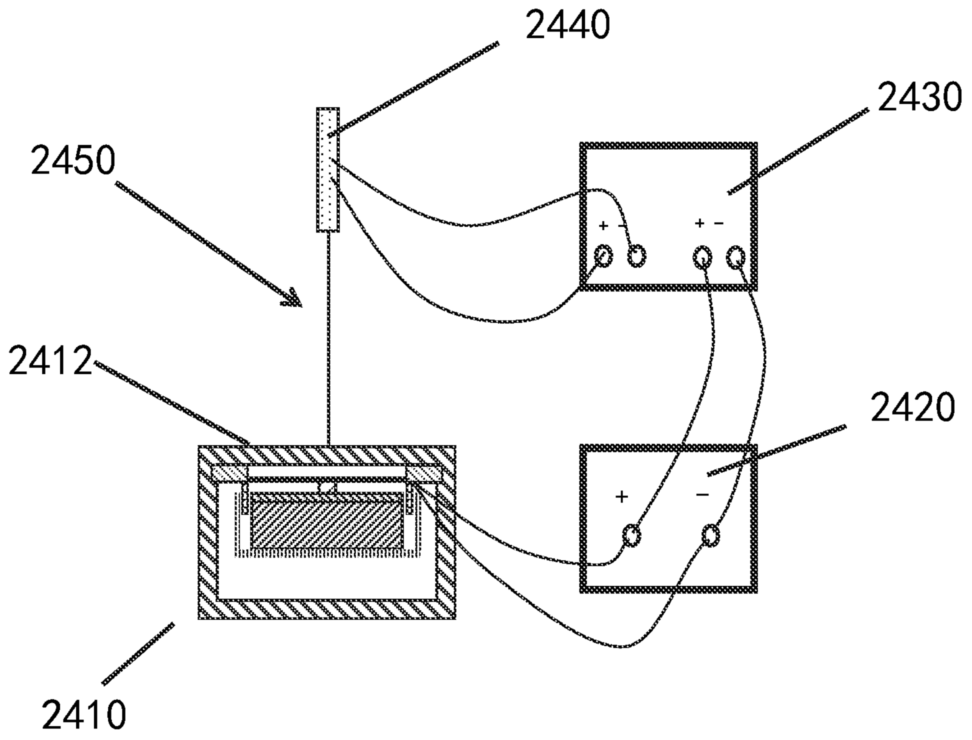
FIG. 24 is a graph illustrating an exemplary method for measuring a vibration of the case of the bone conduction earphone according to some embodiments of the present disclosure.
Figure 25:
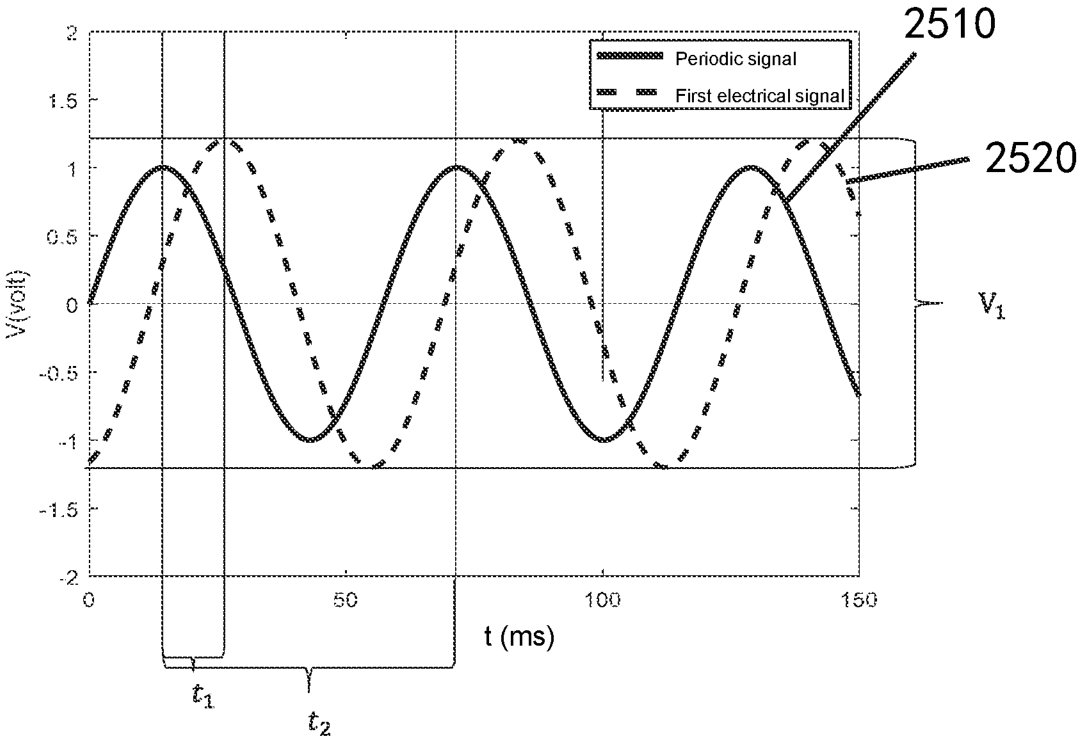
FIG. 25 is a diagram illustrating an exemplary result measured in a manner shown in FIG. 24.
Figure 26:
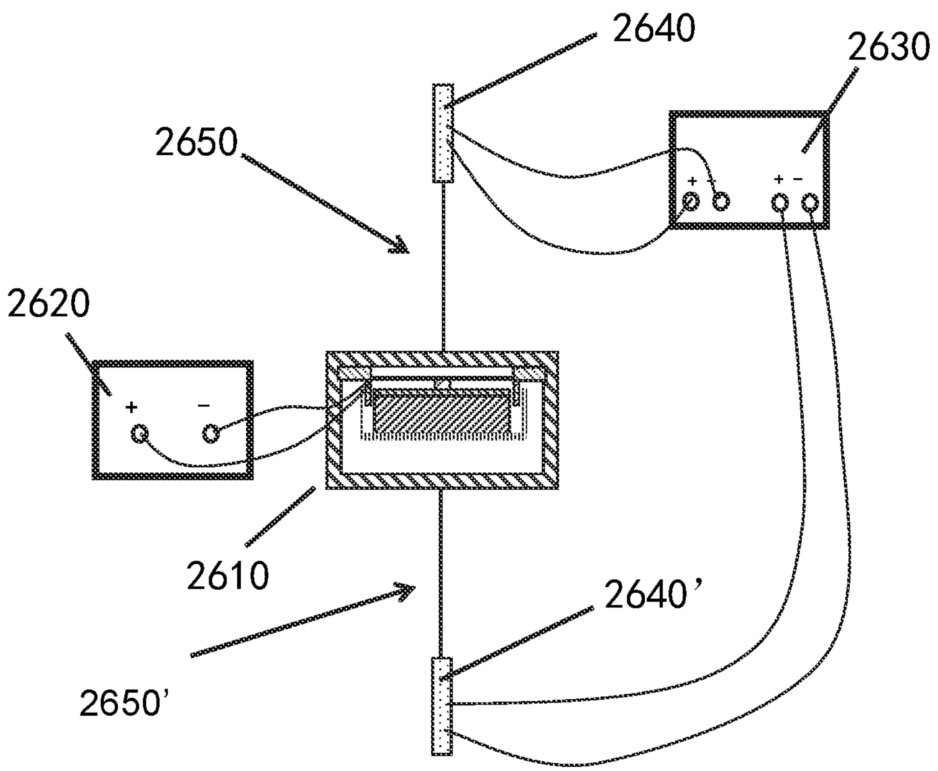
FIG. 26 is a graph illustrating an exemplary method for measuring the vibration of the case of the bone conduction earphone according to some embodiments of the present disclosure.

Specifically, in order to better understand a relationship between the vibration amplitudes and phases of the case panel and the case back in the present disclosure, FIGS. 24-26 show several exemplary methods for measuring the vibration of the case of the bone conduction earphone.

FIG. 24 is a graph illustrating an exemplary method for measuring a vibration of the case of the bone conduction earphone according to some embodiments of the present disclosure. As shown in FIG. 24, a signal generation device 2420 may provide a driving signal to the bone conduction earphone, so that a case panel 2412 of a case 2410 may generate a vibration. For brevity, a periodic signal (for example, a sinusoidal signal) may be used as the driving signal. The case panel 2412 may perform a periodic vibration under the drive of the periodic signal. A distance meter 2440 may transmit a test signal 2450 (for example, a laser) to the case panel 2412, receive the signal reflected from the case panel 2412, convert the reflected signal into a first electrical signal, and send the first electrical signal to a signal testing device 2430. The first electrical signal (also referred to as a first vibration signal) may reflect a vibration state of the case panel 2412. The signal testing device 2430 may compare the periodic signal generated by the signal generation device 2420 with the first electrical signal measured by the distance meter 2440, so as to obtain a phase difference (also called a first phase difference) between the two signals. Similarly, the distance meter 2440 may measure a second electrical signal (also referred to as a second vibration signal) generated by the vibration of the case back. The signal testing device 2430 may obtain a phase difference (also called a second phase difference) between the periodic signal and the second electrical signal. The phase difference between the case panel 2412 and the case back may be obtained based on the first phase difference and the second phase difference. Similarly, by comparing the amplitudes of the first electrical signal and the second electrical signal, a relationship between the vibration amplitudes of the case panel 2412 and the case back may be determined.

In some embodiments, the distance meter 2440 may be replaced by a micrometer. Specifically, the microphone may be placed near the case panel 2412 and the case back, respectively, to measure a sound pressure generated by the case panel 2412 and the case back, thereby obtaining signals similar to the first electrical signal and the second electrical signal. The relationship between the vibration amplitudes and phases of the case panel 2412 and the case back may be determined based on the signals similar to the first electrical signal and the second electrical signal. It should be noted that when measuring magnitudes and phases of the sound pressure generated by the case panel 2412 and the case back, respectively, the microphone may be placed near the case panel 2412 and the case back (for example, a vertical distance is less than 10 mm), and a distance between the microphone and the case panel 2412 may be the same as or close to a distance between the microphone and the case back. In some embodiments, a position of the microphone may be the same as a corresponding position of the case panel 2412 or the case back.

FIG. 25 is a diagram illustrating an exemplary result measured in a manner shown in FIG. 24. In FIG. 25, the horizontal axis represents time, and the vertical axis represents a size of a signal. The solid line 2510 in FIG. 25 may represent the periodic signal generated by the signal generation device 2420, and the dashed line 2520 may represent the first electrical signal measured by the distance meter. An amplitude of the first electrical signal, that is $V_1/2$, may reflect the vibration amplitude of the case panel. The phase difference between the first electrical signal and the periodic signal may be expressed according to Equation (1) as below:

$$Ø_1=360°\cdot t_1/t_2 \tag{1}$$

where $t_1$ represents a time interval between adjacent peaks of the periodic signal and the first electrical signal, and $t_2$ represents a period of the periodic signal.

An amplitude of the second electrical signal may be obtained in a similar manner as the amplitude of the first electrical signal. A ratio of the amplitude of the first electrical signal to the amplitude of the second electrical signal may represent the ratio of the vibration amplitudes of the case panel and the case back. In addition, since there may be a 180° phase difference between the first electrical signal and the second electrical signal during a measurement (that is, the measurement is performed by separately transmitting the test signal to outer surfaces of the case panel and the case back), the phase difference between the second electrical signal and the periodic signal may be determined according to Equation (2) as below:

$$Ø_2 = 360°\cdot\frac{t_1'}{t_2'} - 180°, \tag{2}$$

where $t_1$ represents a time interval between adjacent peaks of the periodic signal and the first electrical signal, and $t_2'$ represents a period of the periodic signal. A difference between $Ø_2$ and $Ø_1$ may reflect a difference in the phases between the case panel 2412 and the case back.

It should be noted that when testing the vibration of the case panel and the case back, respectively, a state of a test system should be as consistent as possible to improve the accuracy of the difference in the phases. If the test system may cause a delay during the measurement, each measurement result may be compensated respectively, or the delay of the test system may be the same when measuring the case panel and the case back to offset an effect of the delay.

FIG. 26 is a graph illustrating another exemplary method for measuring the vibration of the case of the bone conduction earphone according to some embodiments of the present disclosure. A difference between FIG. 24 and FIG. 26 is that FIG. 26 contains two distance meters 2640 and 2640'. The two distance meters may simultaneously measure the vibration of the case panel and the case back of the case 2610 of the bone conduction earphone, and transmit the first and second electrical signals reflecting the vibration of the case panel and the case back to a signal testing device 2630, respectively. Similarly, the two distance meters 2640 and 2640' may be replaced by two microphones, respectively.

Figure 27:
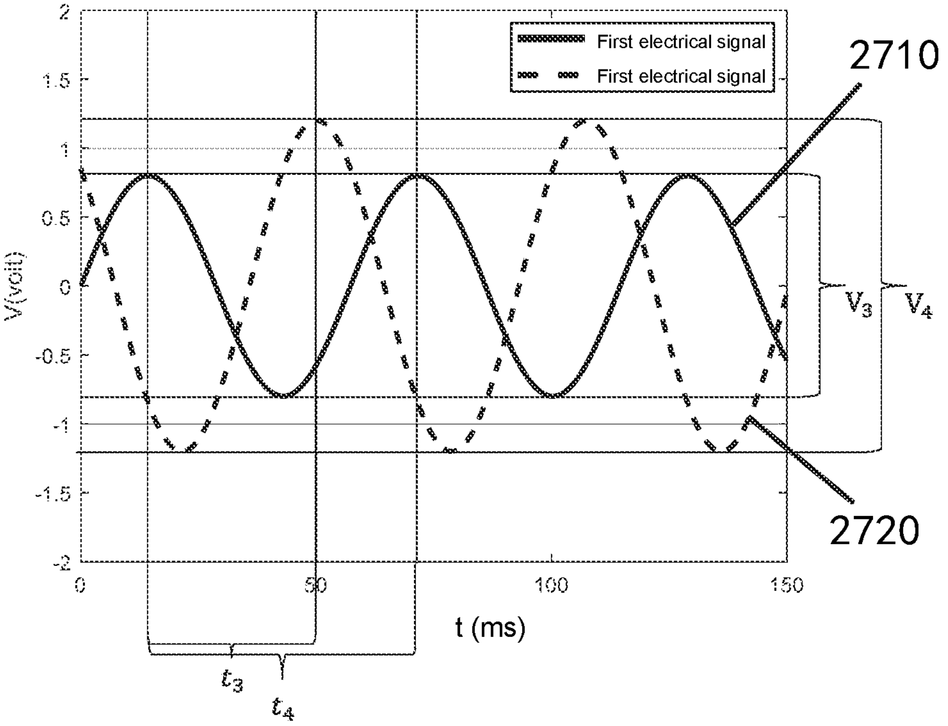
FIG. 27 is a diagram illustrating an exemplary result measured in a manner shown in FIG. 26.

FIG. 27 is a diagram illustrating an exemplary result measured in a manner shown in FIG. 26. In FIG. 27, the solid line 2710 may represent the first electrical signal reflecting the vibration of the case panel, and the dashed line 2720 may represent the second electrical signal reflecting the vibration of the case back. The amplitude of the first electrical signal, $V_3/2$, may reflect the vibration amplitude of the case panel. The amplitude of the second electrical signal, $V_4/2$, may reflect the vibration amplitude of the case back. In this case, the ratio of the vibration amplitudes of the case panel and the case back may be $V_3/V_4$. The phase difference between the first electrical signal and the second electrical signal, that is, the difference in the vibration phases between the case panel and the case back may be determined according to Equation (s) as below:

$$\Delta Ø = 360°\cdot\frac{t_3'}{t_4'} - 180°, \tag{3}$$

where $t_3'$ represents a time interval between adjacent peaks of the first electrical signal and the second electrical signal, and $t_4'$ represents a period of the second electrical signal.

Embodiment 9

Figure 28:
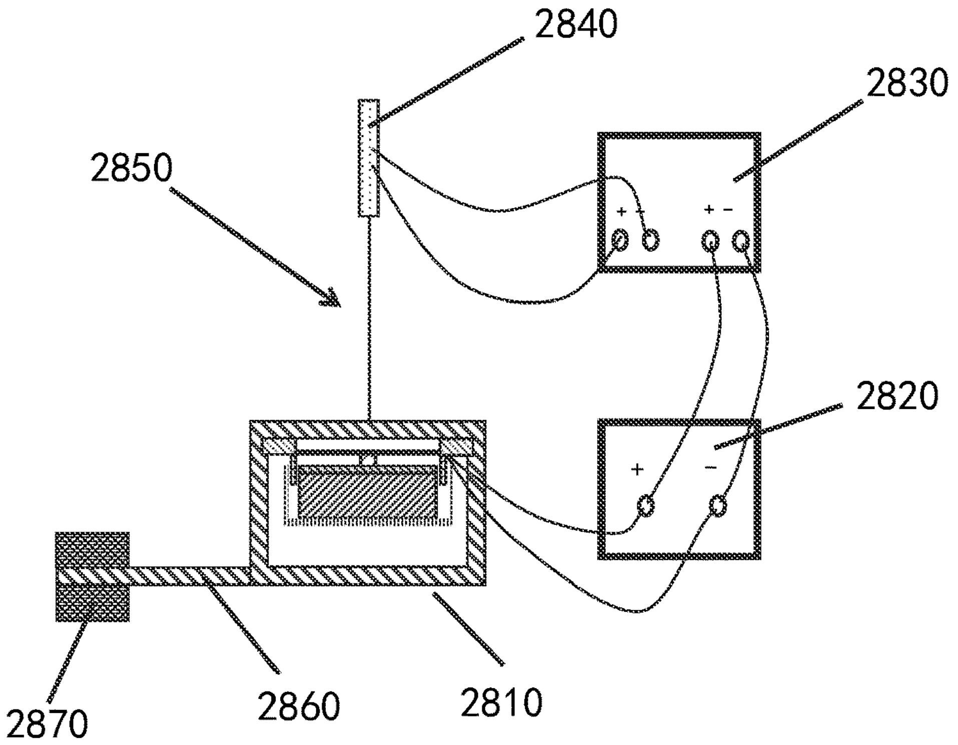
FIG. 28 is a graph illustrating an exemplary method for measuring the vibration of the case of the bone conduction earphone according to some embodiments of the present disclosure.

FIG. 28 is a graph illustrating an exemplary method for measuring the vibration of the case of the bone conduction earphone according to some embodiments of the present disclosure. A difference between FIG. 28 and FIG. 24 is that the case 2810 of the bone conduction earphone may be fixedly connected to an earphone fixing component 2860, for example, by any suitable connection method described elsewhere in the present disclosure. During the measurement, the earphone fixing component 2860 may further be fixed on a fixing device 2870. The fixing device 2870 may keep a part of the earphone fixing component 2860 that is connected to the fixing device 2870 in a still state. After a signal generation device 2820 provides a driving signal to the bone conduction earphone, the entire case 2810 may vibrate relative to the fixing device 2870. Similarly, the signal testing device 2830 may obtain the first electrical signal and the second electrical signal reflecting the vibration of the case panel and the case back, respectively, and determine the phase difference between the case panel and the case back based on the first electrical signal and the second electrical signal.

Figure 29:
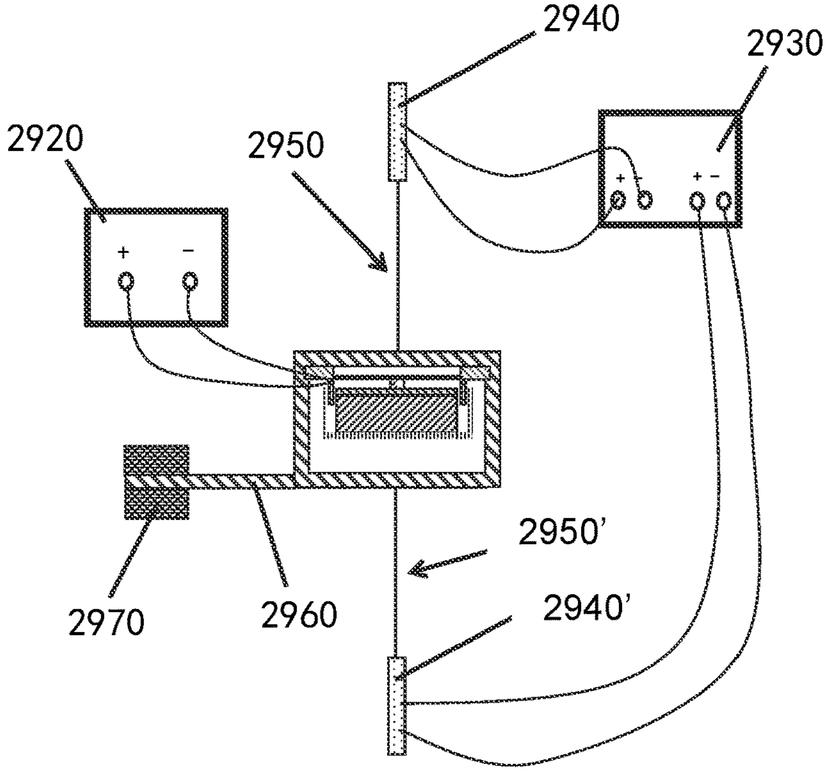
FIG. 29 is a graph illustrating an exemplary method for measuring the vibration of the case of the bone conduction earphone according to some embodiments of the present disclosure.

FIG. 29 is a graph illustrating an exemplary method for measuring the vibration of the case of the bone conduction earphone according to some embodiments of the present disclosure. A difference between FIG. 29 and FIG. 26 is that the case 2910 of the bone conduction earphone may be fixedly connected to the earphone fixing component 2960, for example, by any suitable connection method described elsewhere in the present disclosure. During the measurement, the earphone fixing component 2960 may further be fixed on the fixing device 2970. The fixing device 2970 may keep a part of the earphone fixing component 2960 that is connected to the fixing device 2870 in a still state. After a signal generation device 2920 provides a driving signal to the bone conduction earphone, the entire case 2910 may vibrate relative to the fixing device 2970. Similarly, the signal testing device 2830 may obtain the first electrical signal and the second electrical signal reflecting the vibration of the case panel and the case back at the same time, and determine the phase difference between the case panel and the case back based on the first electrical signal and the second electrical signal.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, certain features, structures, or characteristics in one or more embodiments of the present disclosure may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

At last, it should be understood that the embodiments described in the present disclosure are merely illustrative of the principles of the embodiments of the present disclosure. Other modifications that may be employed may be within the scope of the application. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly described and described by the present disclosure.

What is claimed is:

1. A bone conduction speaker, comprising:

a magnetic circuit component configured to provide a magnetic field;

a vibration component, wherein at least a part of the vibration component is located in the magnetic field and converts an electrical signal inputted into the vibration component into a mechanical vibration signal; and a case comprising a case panel facing a human body side and a case back opposite to the case panel, wherein the case accommodates the vibration component, and the vibration component causes the case panel and the case back to vibrate, a vibration of the case panel having a first phase, a vibration of the case back having a second phase, wherein:

when at a frequency within a range of 2000 Hz to 3000 Hz, the first phase and the second phase have a difference.

2. The bone conduction speaker of claim 1, wherein an absolute value of the difference between the first phase and the second phase being less than 60 degrees.

3. The bone conduction speaker of claim 1, wherein the vibration of the case panel has a first amplitude and the vibration of the case back has a second amplitude, a ratio of the first amplitude to the second amplitude being within a range of 0.5 to 1.5.

4. The bone conduction speaker of claim 1, wherein the vibration of the case panel generates a first sound leakage wave and the vibration of the case back generates a second sound leakage wave, and wherein the first sound leakage wave and the second sound leakage wave have an overlapping that reduces the amplitude of the first sound leakage wave.

5. The bone conduction speaker of claim 1, wherein the bone conduction speaker further comprises a first element, the vibration component being connected to the case through the first element, the Young's modulus of the first element being greater than 4000 MPa.

6. The bone conduction speaker of claim 5, wherein the bone conduction speaker further comprises a second element, a magnetic circuit system being connected to the case through the second element, an elastic modulus of the first element being greater than an elastic modulus of the second element.

7. The bone conduction speaker of claim 1, wherein:

the bone conduction speaker further comprises an earphone fixing component that is configured to maintain a stable contact between the bone conduction speaker and a human body; and the earphone fixing component is fixedly connected to the bone conduction speaker through an elastic member.

8. A bone conduction speaker, comprising:

a magnetic circuit component configured to provide a magnetic field;

a vibration component, at least a part of the vibration component being located in the magnetic field and converting an electrical signal inputted into the vibration component into a mechanical vibration signal;

a case that houses the vibration component; and an earphone fixing component, the earphone fixing component being fixedly connected to the case to maintain a contact between the bone conduction speaker and a human body, wherein:

the case comprises a case panel facing a human body side, a case back opposite to the case panel, and a case side located between the case panel and the case back, the vibration component causing the case panel and the case back to vibrate.

9. The bone conduction speaker of claim 8, wherein:

the case back and the case side are an integrally formed structure; and the case panel is connected to the case side by at least one of gluing, clamping, welding, or screwing.

10. The bone conduction speaker of claim 8, wherein:

the case panel and the case side are an integrally formed structure; and the case back is connected to the case side by at least one of gluing, clamping, welding, or screw.

11. The bone conduction speaker of claim 8, wherein the bone conduction speaker further comprises a first element, wherein the vibration component is connected to the case through the first element, a Young's modulus of the first element being greater than 4000 Mpa.

12. The bone conduction speaker of claim 11, wherein:

the case side and the first element are an integrally formed structure;

the case panel is connected to an outer surface of the first element by at least one of gluing, clamping, welding, or screw; and the case back is connected to and the case side by at least one of gluing, clamping, welding, or screwing.

13. The bone conduction speaker of claim 8, the earphone fixing component and the case back or the case side are an integrally formed structure.

14. The bone conduction speaker of claim 8, the earphone fixing component is connected to the case back or the case side by at least one of gluing, clamping, welding, or screwing.

15. The bone conduction speaker of claim 8, wherein:

the case is a cylinder, and the case panel and the case back are an upper surface and a lower end surface of the cylinder, respectively; and projected areas of the case panel and the case back on a cross section of the cylinder perpendicular to an axis are equal.

16. The bone conduction speaker of claim 8, wherein:

a vibration of the case panel has a first phase and a vibration of the case back has a second phase; and when a frequency of the vibration of the casing panel and a frequency of the vibration of the case back are within a range of 2000 Hz to 3000 Hz, an absolute value of a difference between the first phase and the second phase is less than degrees.

17. The bone conduction speaker of claim 16, wherein the vibration of the case panel and the vibration of the case back comprise a vibration with a frequency within a range of 2000 Hz to 30000 Hz.

18. The bone conduction speaker of claim 16, wherein the vibration of the case panel has a first amplitude and the vibration of the case back has a second amplitude, a ratio of the first amplitude to the second amplitude being within a range of 0.5 to 1.5.

19. The bone conduction speaker of claim 16, wherein the vibration of the case panel generates a first sound leakage wave and the vibration of the case back generates a second sound leakage sound wave, and wherein the first sound leakage wave and the second sound leakage wave have an overlapping that reduces the amplitude of the first sound leakage wave.

20. The bone conduction speaker of claim 16, wherein the case panel and the case back are made of a material with a Young's modulus greater than 4000 Mpa.

* * * * *